(12) United States Patent
Iwamoto et al.

(10) Patent No.: US 7,749,573 B2
(45) Date of Patent: Jul. 6, 2010

(54) ACTINIC RADIATION CURABLE INK-JET INK AND IMAGE FORMING METHOD USING THE SAME

(75) Inventors: Tsutomu Iwamoto, Hachioji (JP); Toshiyuki Takabayashi, Hachioji (JP); Daisuke Ishibashi, Hino (JP); Rieka Sekiguchi, Machida (JP)

(73) Assignee: Konica Minolta Medical & Graphic, Inc. (JP)

( * ) Notice: Subject to any disclaimer, the term of this patent is extended or adjusted under 35 U.S.C. 154(b) by 0 days.

(21) Appl. No.: 11/793,704

(22) PCT Filed: Dec. 14, 2005

(86) PCT No.: PCT/JP2005/022914
§ 371 (c)(1),
(2), (4) Date: Jun. 20, 2007

(87) PCT Pub. No.: WO2006/068010
PCT Pub. Date: Jun. 29, 2006

(65) Prior Publication Data
US 2008/0152832 A1 Jun. 26, 2008

(30) Foreign Application Priority Data
Dec. 24, 2004 (JP) .............................. 2004-373338

(51) Int. Cl.
C08J 7/04 (2006.01)
C09D 11/00 (2006.01)
(52) U.S. Cl. ................. 427/511; 106/31.27; 106/31.28; 522/168
(58) Field of Classification Search .................. 427/511; 522/168; 106/31.27, 31.28
See application file for complete search history.

(56) References Cited

U.S. PATENT DOCUMENTS

| 7,439,281 B2 * | 10/2008 | Ushirogouchi et al. ...... 523/160 |
| 7,470,730 B2 * | 12/2008 | Nishida et al. .............. 523/160 |
| 2004/0050292 A1 | 3/2004 | Nakajima et al. |
| 2004/0101291 A1 * | 5/2004 | Takabayashi et al. ....... 386/125 |
| 2006/0144290 A1 * | 7/2006 | Polk et al. ................. 106/31.65 |

FOREIGN PATENT DOCUMENTS

EP 1491600 A1 12/2004

(Continued)

OTHER PUBLICATIONS

Extended European Search Report for Application No./Patent No. 05816806.3-2102/1829939, PCT/JP2005022914 dated Sep. 17, 2009.

*Primary Examiner*—Shamim Ahmed
(74) *Attorney, Agent, or Firm*—Cantor Colburn LLP

(57) ABSTRACT

An actinic radiation curable ink-jet ink comprising: a metal complex pigment; a cationically polymerizable compound; a polymer dispersing agent having a basic functional group exhibiting an amine value of 5-40 mg/g; and a photo acid generating agent, wherein the cationically polymerizable compound comprises an oxirane ring. The aforesaid actinic radiation curable ink-jet ink enable to achieve an ink-jet ink exhibiting excellent storage stability, ejection capability, and curability after ejection, and enables formation of highly detailed images which realize high density, uniform glossiness, and excellent color reproduction, and forms no wrinkling, and provide a image forming method using the same.

16 Claims, 2 Drawing Sheets

FOREIGN PATENT DOCUMENTS

| | | |
|---|---|---|
| EP | 1500688 A1 | 1/2005 |
| EP | 1508600 A1 | 2/2005 |
| JP | 6-200204 | 7/1994 |
| JP | 11-14825 | 1/1999 |
| JP | 2001-152039 | 6/2001 |
| JP | 2001-220526 | 8/2001 |
| JP | 2001-354869 | 12/2001 |
| JP | 2002-188025 | 7/2002 |
| JP | 2002-188025 A | 7/2002 |
| JP | 2002-317139 | 10/2002 |
| JP | 2002-317139 A | 10/2002 |
| JP | 2003-55449 | 2/2003 |
| JP | 2004-244498 A | 9/2004 |
| JP | 2004-323610 A | 11/2004 |
| JP | 2004-351643 A * | 12/2004 |

* cited by examiner

ACTINIC RADIATION CURABLE INK-JET INK AND IMAGE FORMING METHOD USING THE SAME

CROSS REFERENCE TO RELATED APPLICATIONS

This is a U.S. national stage of application No. PCT/JP2005/022914, filed on 14 Dec. 2005. Priority under 35 U.S.C. §119(a) and 35 U.S.C. 365(b) is claimed from Japanese Application No. 2004-37333 8, filed 24 Dec. 2004, the disclosure of which is also incorporated herein by reference.

TECHNICAL FIELD

The present invention relates to an actinic radiation curable ink-jet ink which exhibits excellent storage stability, ejection capability, and curability after ejection, and enables formation of highly detailed images which realize high density, uniform glossiness, and excellent color reproduction, and forms no wrinkling, and an image forming method using the same.

BACKGROUND

In recent years, ink-jet recording systems, which enable simple formation of images at low cost, have been applied to various printing fields such as photography, various printing, and special printing such as marking and color filters. Specifically, by employing ink-jet recording apparatuses which eject minute controlled dots of ink, ink-jet inks which have been improved in color reproduction, durability, and ejection adaptability, and specialized paper media which have been enhanced in color forming properties of colorants and surface glossiness, it has become possible to achieve image quality comparable to conventional silver halide photography. Image quality of the present ink-jet recording systems is enhanced only when an ink-jet recording apparatus, an ink-jet ink and a specialized paper medium are simultaneously improved.

However, ink-jet systems which require specialized kinds of paper result in problems such that recording media are limited and use of such recording media increases cost. Accordingly, many trials have been conducted in which recording, employing the ink-jet systems, is carried out on transfer media which differ from specialized kinds of paper. Specific systems include a phase-changing ink-jet system employing a wax ink which is solid at room temperature, a solvent based ink-jet system employing rapidly drying organic solvents as a main component, and an actinic radiation curable ink-jet system in which, after recording, actinic radiation such as ultraviolet radiation (UV radiation) is exposed onto the deposited ink to result in crosslinking.

Of these, the UV radiation curable ink-jet system results in relatively low unpleasant odor, compared to a solvent based ink-jet system, whereby an example of the ultraviolet radiation curable ink-jet inks is disclosed (refer to Patent Document 1).

However, even though these actinic radiation curable ink-jet inks are employed, dot diameter after deposition of ink droplets varies markedly, whereby it has been impossible to form highly detailed images on various recording media.

In recent years, a number of ultraviolet radiation curable ink-jet inks, employing cationically polymerizable monomers, have been proposed. Such ultraviolet radiation curable ink-jet inks are not subjected to inhibition due to oxygen, but result in a problem in which they tend to be adversely affected by molecular level moisture (namely ambient humidity). Further, depending on ambience during curing, a problem occurs in which wrinkling is generated due to contraction during curing.

Image formation via the ultraviolet radiation curable ink-jet system is characterized in that it is possible to produce high quality images at low cost and to form images onto recording media which absorb no ink. However, inherent problems of the above ultraviolet radiation curable ink-jet system exist. For example, in cases in which images are formed on recording media which absorb no ink, when curing capability of ink is insufficient, image quality is markedly degraded due to mixing of a deposited dot with adjacent dots. Specifically, when formation of highly detailed images is demanded, mixing of colors of deposited dots results in critical problems. To overcome the above drawbacks, disclosed are actinic radiation curable ink-jet inks which employ, as a photopolymerizable compound, oxirane compounds, vinyl ether compounds, and oxetane compounds (refer to Patent Documents 2 and 3). Further disclosed are actinic radiation curable ink-jet inks which employ, as a photopolymerizable compound, alicyclic epoxy compounds and oxetane compounds (refer to Patent Documents 4 and 5). However, in each of the above proposed methods, desired curability and ejection capability, and formation of high quality images without generation of wrinkling are not simultaneously realized.

Further, application of the ultraviolet radiation curable ink-jet inks to outdoor advertisements is expected since they are highly water resistant. For application to outdoor advertisements, visibility is important, and inks, which result in high chroma, are demanded to reproduce bright colors. When conventional inks are employed, in order to enhance chroma, it has been required to increase the amount of deposited ink or the amount of pigments in the ink. However problems occurred in which an increase in the deposited amount resulted in an increase in the feel of unevenness and non-uniformity of glossiness, while an increase in concentration of pigments resulted in unstable discharge due to poor discharge capability.

Among high-class pigments, known are metal complex pigments which exhibit high durability such as high lightfastness or high heat resistance, and high color forming capability. Specifically, with regard to metal complex pigments of azo compounds, examples of radically photopolymerizable systems for color filters are disclosed (refer to Patent Documents 6-8).

However, heretofore no examples have been found in which ink prepared by dispersing the metal complex pigments of azo compounds into cationically polymerizable monomers is applied to an actinic radiation curable ink-jet ink. In addition, no examples have been found in which desired storage stability, ejection stability and curability are realized, and when cured after ink ejection, highly detailed image quality is realized which exhibits high density, results in uniform glossiness and no wrinkling.

(Patent Document 1) Japanese Patent Publication Open to Public Inspection (hereinafter referred to as JP-A) No. 6-200204 (claims and examples)

(Patent Document 2) JP-A No. 2001-220526 (claims and examples)

(Patent Document 3) JP-A No. 2002-188025 (claims and examples)

(Patent Document 4) JP-A No. 2002-317139 (claims and examples)

(Patent Document 5) JP-A No. 2003-55449 (claims and examples)

(Patent Document 6) JP-A No. 2001-152039 (claims and examples)

(Patent Document 7) JP-A No. 2001-354869 (claims and examples)

(Patent Document 8) JP-A No. 11-14825 (claims and examples)

DISCLOSURE OF THE INVENTION

Problems to be Solved by the Invention

In view of the foregoing, the present invention was achieved. An object of the present invention is to provide an actinic radiation curable ink-jet ink which exhibits excellent storage stability, ejection capability (continuous discharge capability), and curability when metal complex pigments are employed, and enables formation of a highly detailed image which results in high density, uniform glossiness, and no wrinkling, and an image forming method using the same.

Means to Solve the Problems

The above object can be achieved employing the following embodiments.

1. An actinic radiation curable ink-jet ink comprising: a metal complex pigment; a cationically polymerizable compound; a polymer dispersing agent having a basic functional group exhibiting an amine value of 5-40 mg/g; and a photo acid generating agent, wherein the cationically polymerizable compound comprises an oxirane ring.

2. The actinic radiation curable ink-jet ink of item 1, wherein the cationically polymerizable compound comprising an oxirane ring is represented by Formula (I):

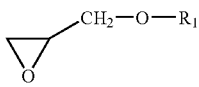

Formula (1)

wherein $R_1$ represents an unsubstituted or substituted alkyl group having 1-10 carbon atoms; an unsubstituted or substituted aromatic group; or an acyl group.

3. The actinic radiation curable ink-jet ink of item 1, wherein the cationically polymerizable compound comprising an oxirane ring is represented by Formula (2):

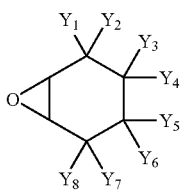

Formula (2)

wherein $Y_1$-$Y_8$ each independently represent a hydrogen atom, an unsubstituted or substituted alkyl, carbonyl, alkoxy, or cycloalkoxy group, provided that $Y_1$ and $Y_8$ may be jointed to form a methylene bond or an ether bond.

4. The actinic radiation curable ink-jet ink of item 1, wherein the cationically polymerizable compound comprising an oxirane ring is α-pinene oxide.

5. The actinic radiation curable ink-jet ink of item 1, wherein the cationically polymerizable compound comprising an oxirane ring is 1,2:8,9-diepoxylimonene.

6. The actinic radiation curable ink-jet ink of item 1, wherein the cationically polymerizable compound comprising an oxirane ring is an epoxidized vegetable oil having an unsaturated bond.

7. The actinic radiation curable ink-jet ink of item 1, wherein the cationically polymerizable compound comprising an oxirane ring is represented by Formula (A):

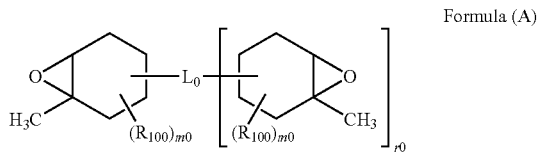

Formula (A)

wherein $R_{100}$ represents a substituent, m0 represents an integer of 0-2, r0 represents an integer of 1-3, and $L_0$ represents a single bond or a (r0+1) valent bonding group having 1-15 carbon atoms, which may incorporate an oxygen atom or a sulfur atom in a backbone of the bonding group.

8. The actinic radiation curable ink-jet ink of any one of items 1-7, further comprising a second cationically polymerizable compound which comprises an oxetane ring.

9. The actinic radiation curable ink-jet ink of any one of items 1-8, wherein the metal complex pigment has an average particle diameter of 50-200 nm.

10. The actinic radiation curable ink-jet ink of any one of items 1-9, wherein the actinic radiation curable ink-jet ink has a viscosity 7-50 mPa·s measured at 25° C.

11. A method of forming an image comprising the steps of:
ejecting droplets of the actinic radiation curable ink-jet ink of any one of items 1-10 on a recording medium from
nozzles of an ink-jet recording head; and
irradiating the ejected droplets of the ink on the recording medium with actinic rays to cure the ink.

12. A method of forming an image comprising the steps of:
ejecting droplets of the actinic radiation curable ink-jet ink of any one of items 1-10 on a recording medium from nozzles of an ink-jet recording head; and
irradiating the ejected droplets of the ink on the recording medium with actinic rays during the time between 0.001 and 1 second after the droplets of the ink are deposited on the recording medium.

13. A method of forming an image comprising the steps of:
ejecting droplets of the actinic radiation curable ink-jet ink of any one of items 1-10 on a recording medium from nozzles of an ink-jet recording head; and
irradiating the ejected droplets of the ink on the recording medium with actinic rays to cure the ink,
wherein, the cured ink has a total thickness of 2-25 μm.

14. A method of forming an image comprising the steps of:
ejecting droplets of the actinic radiation curable ink-jet ink of any one of items 1-10 on a recording medium from nozzles of an ink-jet recording head; and irradiating the ejected droplets of the ink on the recording medium with actinic rays to cure the ink, wherein each of the droplets of the ink from the nozzles of the ink-jet recording head has a volume is 2-20 pl.

15. A method of forming an image comprising the steps of:

ejecting droplets of the actinic radiation curable ink-jet ink of any one of items 11-14 on a recording medium from nozzles of an ink-jet recording head; and irradiating the ejected droplets of the ink on the recording medium with actinic rays to cure the ink, wherein the ink-jet recording head is a line-head.

EFFECTS OF THE INVENTION

The present invention enabled to provide an actinic radiation curable ink-jet ink incorporating a metal complex pigment which exhibits excellent storage stability, ejection capability, and curability after ejection, and enables formation of highly detailed images which realize high density, uniform glossiness, and excellent color reproduction, and forms no wrinkling, and an image forming method using the same.

Figure 1:
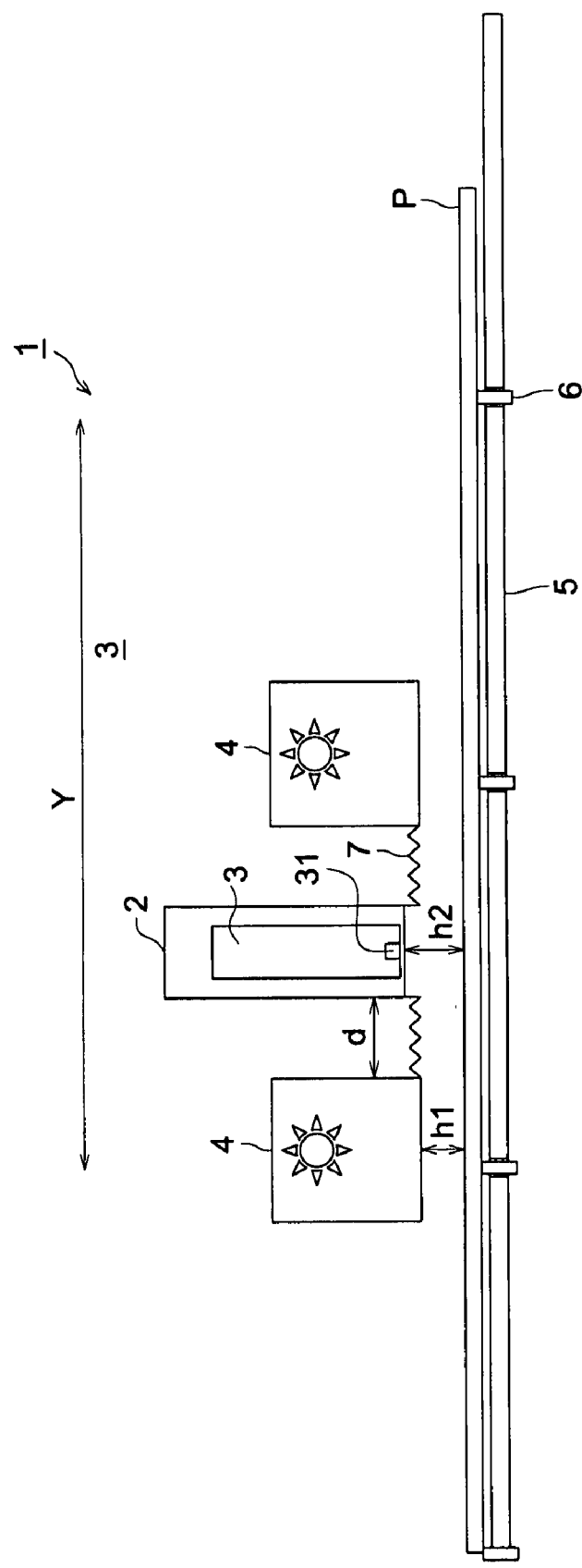
FIG. 1 is a front view showing one example of the structure of the main section of the ink-jet recording apparatus employed in the image forming method of the present invention.

DESCRIPTION OF THE DESIGNATIONS 1 ink-jet recording apparatus
2 head carriage
3 ink-jet recording head
31 ink discharge orifice
4 exposure means
5 platen section
6 guide member
7 bellow structure
P recording medium

THE PREFERRED EMBODIMENTS TO CARRY OUT THE INVENTION

Preferred embodiments to practice the present invention will now be detailed.

In view of the above problems, the inventors of the present invention conducted diligent investigations. As a result, the following was discovered, and the present invention was achieved. By incorporating at least a metal complex pigment, a cationically polymerizable compound, a polymer dispersing agent, and a photo acid generating agent having a basic functional group at an amine value of 5-40 mg KOH/g, in which the above cationically polymerizable compound was the compound represented by above 2.-7., it was possible to prepare an actinic radiation curable ink-jet ink which exhibited excellent storage stability, ejection capability (continuous discharge capability), and curability, and which readily formed highly detailed images which resulted in high density, uniform glossiness and no wrinkling.

Metal complex pigments according to the present invention are complex pigments incorporating metal atoms. Examples of such metal complex pigments include C.I. Pigment Green 10, C.I. Pigment Yellow 117, C.I. Pigment Yellow 129, C.I. Pigment Yellow 150, C.I. Pigment Yellow 153, C.I. Pigment Yellow 177, C.I. Pigment Yellow 179, C.I. Pigment Yellow 271, C.I. Pigment Red 257, C.I. Pigment Orange 59, C.I. Pigment Orange 65, and C.I. Pigment Orange 68.

With regard to dispersion of pigments, after pigments and dispersion media are selected, the appropriate dispersion and filtering conditions are set so that the average diameter of pigment particles preferably reaches 0.05-0.5 μm and the maximum particle diameter reaches commonly 0.5-10 μm, but preferably 0.3-3 μm. Based on the above particle diameter management, it is possible to minimize clogging of head nozzles and to maintain storage stability, transparency, and curing rate of the resulting ink. Concentration of pigments is preferably 1-10% by weight with respect to the weight of the total ink.

In the present invention, it is necessary to incorporate polymer dispersing agents having a basic functional group at an amine value of 5-40 mg/KOH, which functions as a dispersing agent of the pigments.

In view of curability, it is particularly preferable that the amine value according to the present invention is 5-19 mg KOH/g.

The amine value according to the present invention is defined as follows. Distribution of acid and base amounts is formed on the surface of pigments and dispersing agents. When the acid amount is more than the base amount, basicity results and its magnitude is called an amine value. In a pigment dispersion, adsorption, due to the mutual acid-base interaction of pigments and dispersing agents plays a major role to stabilize the resulting dispersion. The amine value of dispersing agents is determined as follows. A dispersing agent is dissolved in methyl isobutyl ketone, and the resulting solution is subjected to potentiometric titration, employing a 0.01N perchloric acid methyl isobutyl ketone solution. The determined value is converted in terms of KOH mg/g, and the resulting value is designated as the amine value. Potentiometric titration was carried out employing automatic titrator COM-1500, produced by Hiranuma Sangyo Corp.

Examples include, but are not limited to, the SOLSPERSE Series such as SOLSPERSE 32000, SOLSPERSE 24000GR, or SOLSPERSE 28000, produced by Avecia Co.; the DISPERON Series such as ED211, ED212, ED213, ED214, or ED251, produced by Kusumoto Chemicals Ltd.; and the AJISPER Series such as PB821, PB822, or PB824, produced by Ajinomoto-Fine-Techno Co., Inc.

The added amount of the polymer dispersing agents according to the present invention is preferably 10-100 parts by weight with respect to 100 parts by weight of the pigments, but is more preferably 10-60 parts by weight. The reason for that is assumed to be that during curing via cationically polymerizable monomers, dispersing agents trap photolytically generating acids.

Solvents or polymerizable compounds are employed as a dispersion medium. In the actinic radiation curable ink-jet ink, in order to undergo reaction and curing immediately after deposition of ink droplets, it is preferable to employ no solvent. When solvents remain in cured images, solvent resistance is deteriorated and the VOC problem of residual solvents occurs. Consequently, in view of dispersion adaptability, instead of solvents, it is preferable, as a dispersion medium, to select polymerizable monomers, of these, especially monomers exhibiting the lowest viscosity.

The ink-jet ink according to the present invention contains cationically polymerizable compounds as a photolytically polymerizable compound. The cationically polymerizable compounds include compounds having an oxirane ring, which may be used preferably with compounds having an oxetane ring.

The compounds incorporating compounds having an oxirane ring are applicable to the ink-jet ink according to the present invention. Compounds having an oxirane ring are not particularly limited. Examples thereof include the compounds represented by above Formulas (1) and (2), α-pinene oxide, 1,2:8,9-diepoxylimonene, epoxidized vegetable oil having unsaturated bonds, and compounds represented by following Formula (A).

Each of the compounds having an oxirane ring, applicable to the ink-jet ink according to the present invention, will now be described.

In above Formula (1), $R_1$ represents an unsubstituted or substituted alkyl group having 1-10 carbon atoms (for example, substitutable methyl, ethyl, propyl, butyl, isopropyl, t-butyl, hexyl, 2-ethylhexyl, and benzyl groups), an unsubstituted or substituted aromatic group (for example, a phenyl group and a naphthyl group), an unsubstituted or substituted acyl group (for example, a benzoyl group, a methacryl group, and a stearyl group). Of these exemplified groups, an alkyl group is preferable.

The specific examples represented by above Formula (I) will now be listed; however, the present invention is not limited thereto.

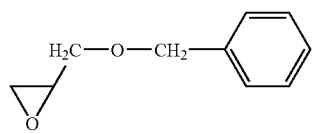

EPA-1

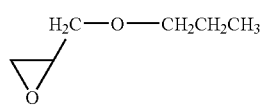

EPA-2

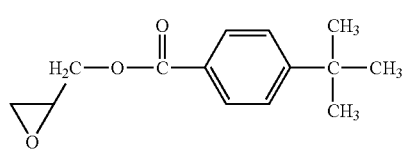

EPA-3

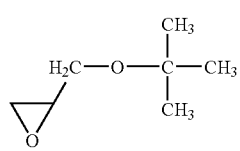

EPA-4

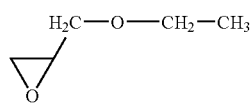

EPA-5

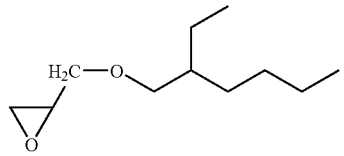

EPA-6

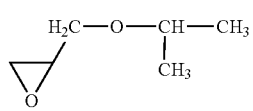

EPA-7

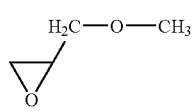

EPA-8

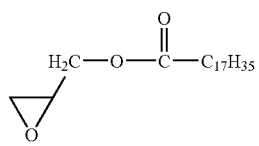

EPA-9

Further, the compounds having an oxirane ring represented by the above Formula (2) will now be described.

In above Formula (2), $Y_1$-$Y_8$ each, which may differ, represent a hydrogen atom, an unsubstituted or substituted alkyl group (for example, a methyl group, an ethyl group, a propyl group, a butyl group, an isopropyl group, a t-butyl group, a hexyl group, a 2-ethylhexyl group, and a benzyl group), an unsubstituted or substituted carbonyl group (for example, an acetyl group and a benzoyl group), an alkoxy group, or a cycloalkoxy group. $Y_1$ and $Y_8$ may join to form a methylene or ether bond.

Preferred examples of the compounds having an oxirane ring represented by above Formula (2) include compounds represented by following Formulas (III) and (IV) shown below.

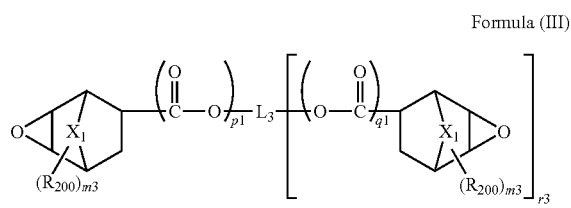

Formula (III)

In above Formula (III), $R_{200}$ represents an aliphatic group located in any position except for the α or β position of the oxirane ring, and m3 represents 0-2. $X_1$ represents —$(CH_2)_{n0}$— or —$(O)_{n0}$—, and n0 represents 0 or 1. p1 and q1 each represent 0 or 1, not being 0 simultaneously. r3 represents 1-3. $L_3$ represents a single bond or a (r3+1) valent branched connecting group having 1-15 carbon atoms, which may have an oxygen atom or a sulfur atom in the main chain.

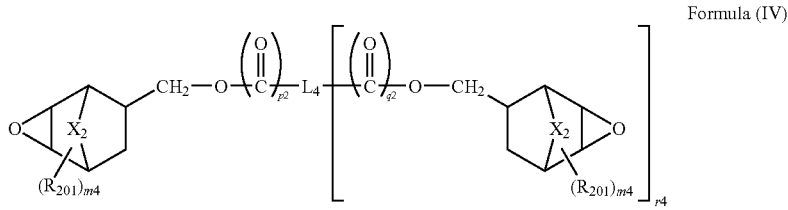

Formula (IV)

In above Formula (IV), $R_{201}$ represents an aliphatic group located in any position except for the α or β position of the oxirane ring, and m4 represents 0-2. $X_2$ represents $-(CH_2)_{n1}-$ or $-(O)_{n1}-$, and n1 represents 0 or 1, while p2 and q2 each represent 0 or 1, not being 0 simultaneously. r4 represents 1-3. $L_4$ represents a single bond or a (r4+1) valent branched connecting group having 1-15 carbon atoms, which may have an oxygen atom or a sulfur atom in the main chain.

The compounds having an oxirane ring represented by above Formulas (III) and (IV) are detailed below.

In above Formula (III), $R_{200}$ represents an aliphatic group located in any position except for the α or β position of the oxirane ring. Examples of the aliphatic group include an alkyl group having 1-6 carbon atoms (for example, a methyl group, an ethyl group, a propyl group, an isopropyl group, and a butyl group), a cycloalkyl group having 3-6 carbon atoms (for example, a cyclopropyl group, cyclobutyl group, a cyclopentyl group, and a cyclohexyl group), an alkenyl group having 1-6 carbon atoms (for example, a vinyl group, a 1-propenyl group, a 2-propenyl group, and a 2-butenyl group), and an alkynyl group having 1-6 carbon atoms (for example, an acetylenyl group, a 1-propynyl group, a 2-propynyl group, and a 2-butynyl group). Preferred examples include an alkyl group having 1-3 carbon atoms, but a methyl group and an ethyl group are more preferable.

m3 represents 0-2, but is preferably 1 or 2. $X_1$ represents $-(CH_2)_{n0}-$ or $-(O)_{n0}-$, and n0 represents 0 or 1. Provided n0 is 0, $X_1$ is not present. m3 plus n0 is preferably at least 1. $L_3$ represents a single bond or a (r3+1) valent branched connecting group having 1-15 carbon atoms, which may have an oxygen atom or a sulfur atom in the main chain. p1 and q1 each represent 0 or 1, not being 0 simultaneously. r3 represents 1-3.

Further, the compounds having an oxirane ring represented by above Formula (IV) will now be described.

In above Formula (IV), $R_{201}$ represents an aliphatic group located in any position except for the α or β position of the oxirane ring. Examples of the aliphatic group include an alkyl group having 1-6 carbon atoms (for example, a methyl group, an ethyl group, a propyl group, an isopropyl group, and a butyl group), a cycloalkyl group having 3-6 carbon atoms (for example, a cyclopropyl group, cyclobutyl group, a cyclopentyl group, and a cyclohexyl group), an alkenyl group having 1-6 carbon atoms (for example, a vinyl group, a 1-propenyl group, a 2-propenyl group, and a 2-butenyl group), and an alkynyl group having 1-6 carbon atoms (for example, an acetylenyl group, a 2-propynyl group, and a 2-butynyl group). An alkyl group having 1-3 carbon atoms is preferable, but a methyl group and an ethyl group are more preferable.

m4 represents 0-2, but is preferably 1 or 2. $X_2$ represents $-(CH_2)_{n1}-$ or $-(O)_{n1}-$, and n1 represents 0 or 1. Provided n1 is 0, $X_2$ is not present. m4 plus n1 is preferably at least 1. P2 and q2 each represent 0 or 1, not being 0 simultaneously. r4 represents 1-3.

$L_4$ represents a single bond or a (r4+1) valent branched connecting group having 1-15 carbon atoms, which may have an oxygen atom or a sulfur atom in the main chain.

In above Formula (III) or (IV), examples of the divalent connecting groups having 1-15 carbon atoms, which may have an oxygen atom or a sulfur atom in the main chain, include the following groups. These groups may be combined with a plurality of groups of an $-O-$ group, an $-S-$ group, a $-CO-$ group, and a $-CS-$ group.

ethylidene group: $>CHCH_3$,
isopropylidene group: $>C(CH_3)_2$,
2,2-dimethyl-1,3-propanediyl group: $-CH_2C(CH_3)_2CH_2-$,
2,2-dimethoxy-1,3-propanediyl group: $-CH_2C(OCH_3)_2CH_2-$,
2,2-dimethoxymethyl-1,3-propanediyl group: $-CH_2C(CH_2OCH_3)_2CH_2-$,
1-methyl-1,3-propanediyl group: $-CH(CH_3)CH_2CH_2-$,
1,4-dimethyl-3-oxa-1,5-pentanediyl group: $-CH(CH_3)CH_2OCH(CH_3)CH_2-$,
1,4,7-trimethyl-3,6-dioxa-1,8-octanediyl group: $-CH(CH_3)CH_2OCH(CH_3)CH_2OCH(CH_3)CH_2-$
5,5-dimethyl-3,7-dioxa-1,9-nonanediyl group: $-CH_2CH_2OCH_2C(CH_3)_2CH_2OCH_2CH_2-$
5,5-dimethoxy-3,7-dioxa-1,9-nonanediyl group: $-CH_2CH_2OCH_2C(OCH_3)-$
5,5-dimethoxymethyl-3,7-dioxa-1,9-nonanediyl group: $-CH_2CH_2OCH_2C(CH_2OCH_3)_2CH_2OCH_2CH_2-$, and
isopropylidenebis-p-phenylene group:
-p-$C_6H_4$—$C(CH_3)_2$-p-$C_6H_4$—

Examples of the connecting groups, being trivalent or more, include groups formed by eliminating the necessary number of the hydrogen atoms, which are located in any of the positions of the above divalent connecting groups, and groups formed by combining these aforesaid groups with a plurality of groups of an $-O-$ group, an $-S-$ group, a $-CO-$ group, and a $-CS-$ group.

$L_3$ and $L_4$ each may have substituents. Examples of the substituents include a halogen atom (for example, a chlorine atom, a bromine atom, and a fluorine atom), an alkyl group having 1-6 carbon atoms (for example, a methyl group, an ethyl group, a propyl group, an isopropyl group, and a butyl-group), an alkoxy group having 1-6 carbon atoms (for example, a methoxy group, an ethoxy group, a n-propoxy group, an isopropoxy group, an n-butoxy group, and a tert-butoxy group), an acyl group (for example, an acetyl group, a propionyl group, and a trifluoroacetyl group), an acyloxy group (for example, an acetoxy group, a propionyloxy group, and a trifluoroacetoxy group), and an alkoxycarbonyl group (for example, a methoxycarbonyl group, an ethoxycarbonyl group, and a tert-butoxycarbonyl group). Preferred examples of the substituents include a halogen atom, an alkyl group, and an alkoxy group.

Examples of the compounds having epoxy groups represented by above Formula (2) will now be listed; however, the present invention is not limited thereto.

EPB-1
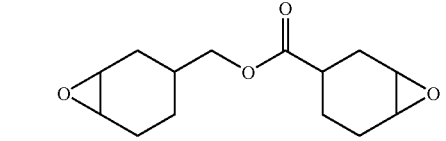

EPB-2
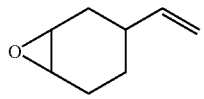

EPB-3
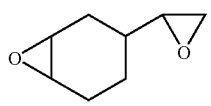

EPB-4
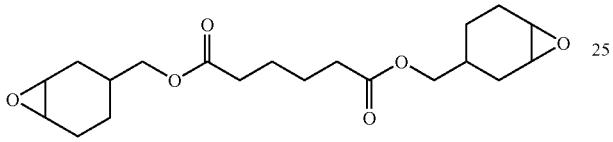

EPB-5
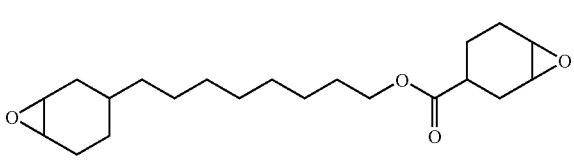

EPD-1
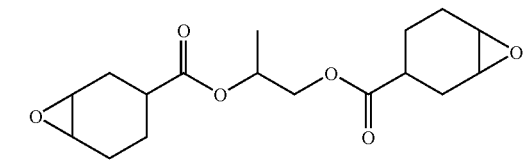

EPD-2
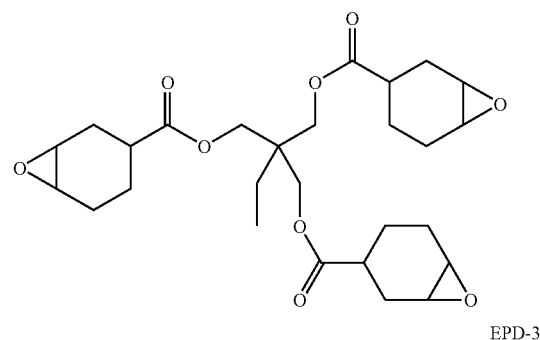

EPD-3
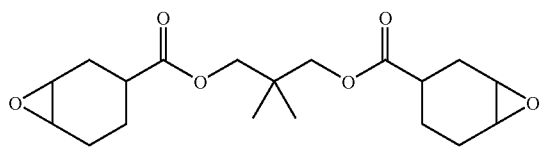

EPD-4
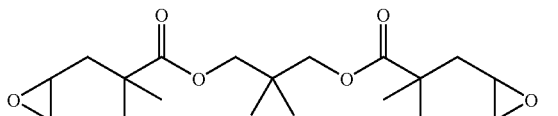

EPD-5
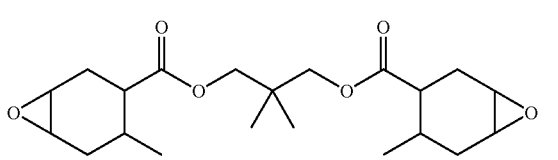

EPD-6

EPD-7
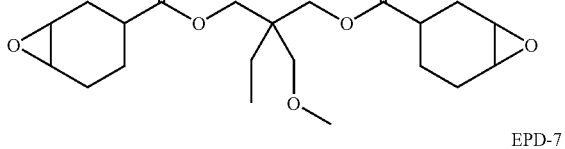

EPD-8
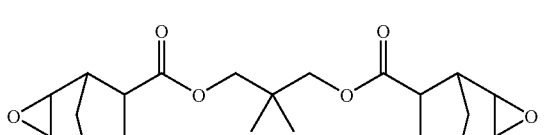

EPD-9
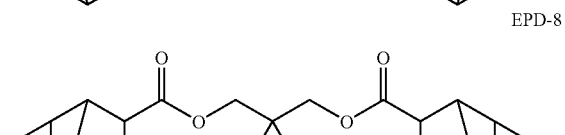

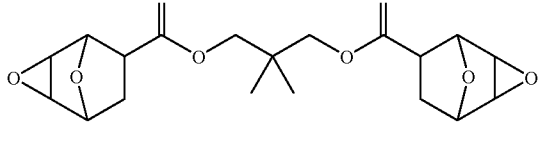

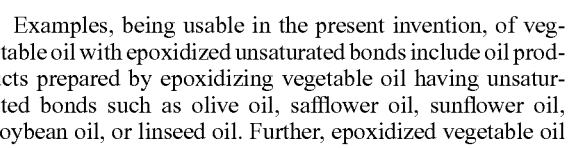

Examples, being usable in the present invention, of vegetable oil with epoxidized unsaturated bonds include oil products prepared by epoxidizing vegetable oil having unsaturated bonds such as olive oil, safflower oil, sunflower oil, soybean oil, or linseed oil. Further, epoxidized vegetable oil available on the market may be used. Examples include SANSOCIZER-E-4030 manufactured by New Japan Chemical Co., Ltd., and Vf7010, Vf9010, and Vf9040 by ATOFINA Chemicals, Inc.

Further, the compounds with an oxirane ring represented by above Formula (A) will now be described.

In above Formula (A), $R_{100}$ represents a substituent. Examples thereof include a halogen atom (for example, a chlorine atom, a bromine atom, and a fluorine atom), an alkyl group having 1-6 carbon atoms (for example, a methyl group, an ethyl group, a propyl group, an isopropyl group, and a butyl group), an alkoxy group having 1-6 carbon atoms (for example, a methoxy group, an ethoxy group, a n-propoxy group, an isopropoxy group, a n-butoxy group, and a tert-butoxy group), an acyl group (for example, an acetyl group, a propionyl group, and a trifluoroacetyl group), an acyloxy group (for example, an acetoxy group, a propionyloxy group, and a trifluoroacetoxy group), and an alkoxycarbonyl group (for example, a methoxycarbonyl group, an ethoxycarbonyl group, and a tert-butoxycarbonyl group). Preferred examples of the substituent include a halogen atom, an alkyl group, and an alkoxy group. m0 represents 0-2, but is preferably 0 or 1. r0 represents 1-3. $L_0$ represents a single bond or a (r0+1) valent connecting group having 1-15 carbon atoms, which may have an oxygen atom or a sulfur atom in the main chain.

Further, the compounds having an oxirane ring represented by above Formula (A) are preferably the alicyclic epoxy compounds represented by following Formula (I) or (II).

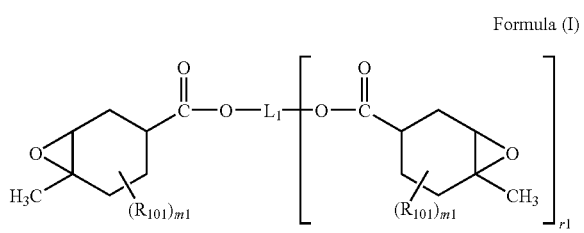

Formula (I)

In above Formula (I), $R_{101}$ represents a substituent, and m1 represents 0-2. r1 represents 1-3. $L_1$ represents a single bond or a (r1+1) valent connecting group having 1-15 carbon atoms, which may have an oxygen atom or a sulfur atom in the main chain.

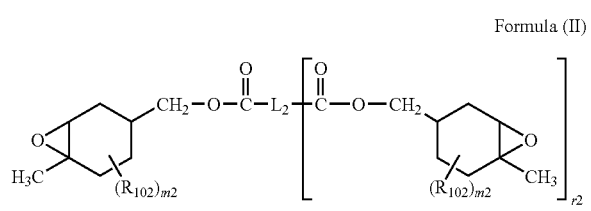

Formula (II)

In above Formula (II), $R_{102}$ represents a substituent, and m2 represents 0-2. r2 represents 1-3. $L_2$ represents a single bond or a (r2+1) valent connecting group having 1-15 carbon atoms, which may have an oxygen atom or a sulfur atom in the main chain.

In the compounds represented by above Formula (I) or (II), $R_{101}$ and $R_{102}$ each represent a substituent. Examples thereof include a halogen atom (for example, a chlorine atom, a bromine atom, and a fluorine atom), an alkyl group having 1-6 carbon atoms (for example, a methyl group, an ethyl group, a propyl group, an isopropyl group, and a butyl group), an alkoxy group having 1-6 carbon atoms (for example, a methoxy group, an ethoxy group, a n-propoxy group, an isopropoxy group, a n-butoxy group, and a tert-butoxy group), an acyl group (for example, an acetyl group, a propionyl group, and a trifluoroacetyl group), an acyloxy group (for example, an acetoxy group, a propionyloxy group, and a trifluoroacetoxy group), and an alkoxycarbonyl group (for example, a methoxycarbonyl group, an ethoxycarbonyl group, and a tert-butoxycarbonyl group). Preferred examples of the substituent include a halogen atom, an alkyl group, and an alkoxy group.

m1 and m2 each represent 0-2, but are preferably 0 or 1.

$L_1$ represents a single bond or a (r1+1) valent connecting group having 1-15 carbon atoms, which may have an oxygen atom or a sulfur atom in the main chain. $L_2$ represents a single bond or a (r2+1) valent connecting group having 1-15 carbon atoms, which may have an oxygen atom or a sulfur atom in the main chain.

The connecting groups represented by $L_1$, $L_2$, and $L_3$ are generally shown in above Formulas (A), (I), and (II). Listed below are examples of $L_1$, $L_2$, and $L_3$, being divalent connecting groups having 1-15 carbon atoms, which may have an oxygen atom or a sulfur atom in the main chain. These divalent groups may be combined with a plurality of groups of an —O— group, an —S— group, a —CO— group, and a —CS— group.

methylene group: —CH$_2$—,
ethylidene group: >CHCH$_3$,
isopropylidene group: >C(CH$_3$)$_2$,
1,2-ethylene group: —CH$_2$CH$_2$—,
1,2-propylene group: —CH(CH$_3$)CH$_2$—,
1,3-propanediyl group: —CH$_2$CH$_2$CH$_2$—,
2,2-dimethyl-1,3-propanediyl group: —CH$_2$C(CH$_3$)$_2$CH$_2$—,
2,2-dimethoxy-1,3-propanediyl group: —CH$_2$C(OCH$_3$)$_2$CH$_2$—,
2,2-dimethoxymethyl-1,3-propanediyl group:
—CH$_2$C(CH$_2$OCH$_3$)$_2$CH$_2$—,
1-methyl-1,3-propanediyl group: —CH(CH$_3$)CH$_2$CH$_2$—,
1,4-butanediyl group: —CH$_2$CH$_2$CH$_2$CH$_2$—,
1,5-pantanediyl group: —CH$_2$CH$_2$CH$_2$CH$_2$CH$_2$—,
oxydiethylene group: —CH$_2$CH$_2$OCH$_2$CH$_2$—,
thiodiethylene group: —CH$_2$CH$_2$SCH$_2$CH$_2$—,
3-oxothiodiethylene group: —CH$_2$CH$_2$SOCH$_2$CH$_2$—,
3,3-dioxothiodiethylene group:
—CH$_2$CH$_2$SO$_2$CH$_2$CH$_2$—,
1,4-dimethyl-3-oxa-1,5-pentanediyl group:
—CH(CH$_3$)CH$_2$O—CH(CH$_3$)CH$_2$—,
3-oxopentanediyl group: —CH$_2$CH$_2$COCH$_2$CH$_2$—,
1,5-dioxo-3-oxapentanediyl group:
—COCH$_2$OCH$_2$CO—,
4-oxa-1,7-heptanediyl group:
—CH$_2$CH$_2$CH$_2$OCH$_2$CH$_2$CH$_2$—,
3,6-dioxa-1,8-octanediyl group:
—CH$_2$CH$_2$OCH$_2$CH$_2$OCH$_2$CH$_2$—,
1,4,7-trimethyl-3,6-dioxa-1,8-octanediyl group:
—CH(CH$_3$)CH$_2$O—CH(CH$_3$)CH$_2$OCH(CH$_3$)CH$_2$—,
5,5-dimethyl-3,7-dioxa-1,9-nonanediyl group:
—CH$_2$CH$_2$OCH$_2$C(CH$_3$)$_2$CH$_2$OCH$_2$CH$_2$—,
5,5-dimethoxy-3,7-dioxa-1,9-nonanediyl group:
—CH$_2$CH$_2$OCH$_2$C(OCH$_3$)$_2$CH$_2$OCH$_2$CH$_2$—,
5,5-dimethoxymethyl-3,7-dioxa-1,9-nonanediyl group:
—CH$_2$CH$_2$OCH$_2$C(CH$_2$OCH$_3$)$_2$CH$_2$OCH$_2$CH$_2$—,
4,7-dioxo-3,8-dioxa-1,10-decanediyl group:
—CH$_2$CH$_2$O—COCH$_2$CH$_2$CO—OCH$_2$CH$_2$—,
3,8-dioxo-4,7-dioxa-1,10-decanediyl group:
—CH$_2$CH$_2$CO—OCH$_2$CH$_2$O—COCH$_2$CH$_2$—,
1,3-cyclopentanediyl group: -1,3-C$_5$H$_8$—
1,2-cyclohexanediyl group: -1,2-C$_6$H$_{10}$—
1,3-cyclohexanediyl group: -1,3-C$_6$H$_{10}$—
1,4-cyclohexanediyl group: -1,4-C$_6$H$_{10}$—
2,5-tetrahydrofuranediyl group: 2,5-C$_4$H$_6$O—
p-phenylene group: -p-C$_6$H$_4$—
m-phenylene group: -m-C$_6$H$_4$—
α,α'-o-xylylene group: -o-CH$_2$—C$_6$H$_4$—CH$_2$—
α,α'-m-xylylene group: -m-CH$_2$—C$_6$H$_4$—CH$_2$—
α,α'-p-xylylene group: -p-CH$_2$—C$_6$H$_4$—CH$_2$—
furane-2,5-diyl-bismethylene group: 2,5-CH$_2$—C$_4$H$_2$O—CH$_2$—, thiophene-2,5-diyl-bismethylene group:
2,5-CH$_2$—C$_4$H$_2$S—CH$_2$—, and
isopropylidenebis-p-phenylene group:
-p-C$_6$H$_4$—C(CH$_3$)$_2$-p-C$_6$H$_4$—

Examples of the connecting groups, being trivalent or more, include groups formed by eliminating the necessary number of the hydrogen atoms, which are located in any of the positions of the above divalent connecting groups, and groups formed by combining the aforesaid connecting groups, being trivalent or more, with a plurality of groups of an —O— group, an —S— group, a —CO— group, and a —CS— group.

$L_0$, $L_1$ and $L_2$ each may have a substituent. Examples of the substituent include a halogen atom (for example, a chlorine atom, a bromine atom, and a fluorine atom), an alkyl group having 1-6 carbon atoms (for example, a methyl group, an ethyl group, a propyl group, an isopropyl group, and a butyl group), an alkoxy group having 1-6 carbon atoms (for example, a methoxy group, an ethoxy group, a n-propoxy group, an isopropoxy group, a n-butoxy group, and a tert-butoxy group), an acyl group (for example, an acetyl group, a propionyl group, and a trifluoroacetyl group), an acyloxy group (for example, an acetoxy group, a propionyloxy group, and a trifluoroacetoxy group), and an alkoxycarbonyl group (for example, a methoxycarbonyl group, an ethoxycarbonyl group, and a tert-butoxycarbonyl group). Preferred examples of the substituent include an alkyl group, an alkoxy group, and an alkoxycarbonyl group.

Preferred examples of $L_0$, $L_1$ and $L_2$ include divalent connecting groups, which may have an oxygen atom or a sulfur atom in the main chain. More preferred examples include divalent connecting groups having 1-5 carbon atoms, which contain only carbon atoms in the main chain.

Specific examples of the alicyclic epoxy compounds represented by Formula (A) are listed below; however, the present invention is not limited thereto.

EPC-1

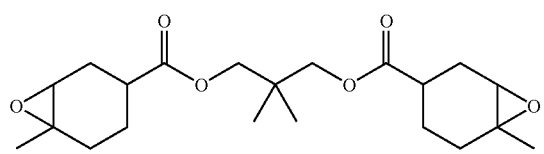

Molecular weight: 380.48

EPC-2

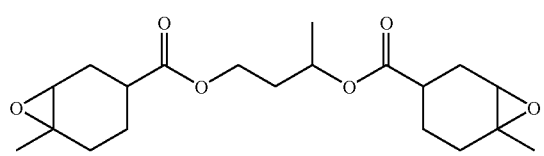

Molecular weight: 366.45

EPC-3

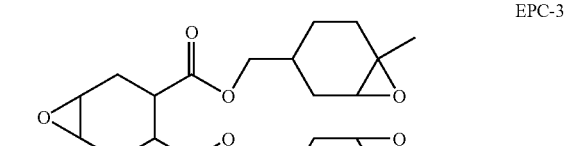

Molecular weight: 434.52

EPC-4

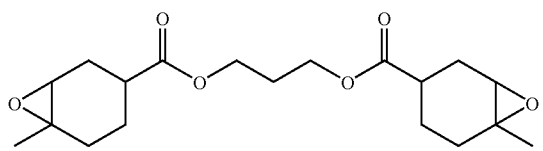

Molecular weight: 352.42

EPC-5

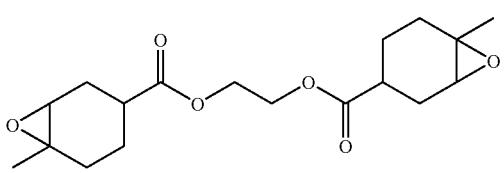

Molecular weight: 338.40

EPC-6

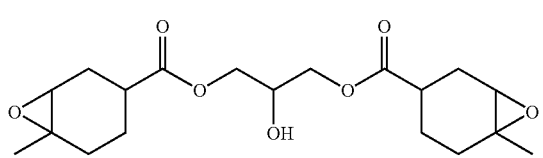

Molecular weight: 380.48

EPC-7

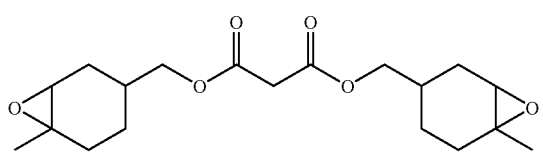

Molecular weight: 352.42

EPC-8

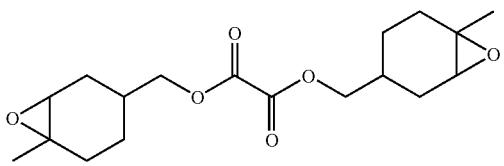

Molecular weight: 338.40

EPC-9

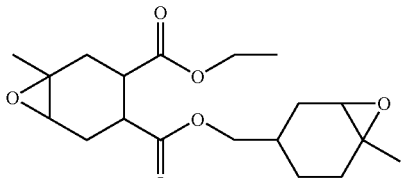

Molecular weight: 352.42

EPC-10

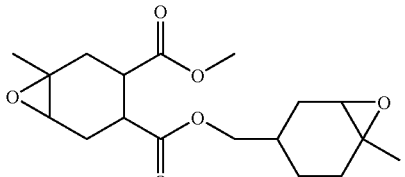

Molecular weight: 338.4

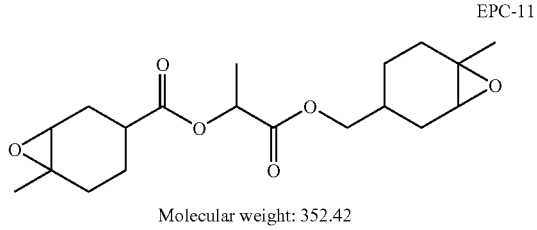

EPC-11

Molecular weight: 352.42

It is desirable that the added amount of a compound having an oxirane ring ranges from 10 to 80% by weight from the viewpoint of curability and film properties after curing. In the present invention, it is possible not only to individually use one kind of compound having an oxirane ring but also to appropriately combine two or more kinds thereof.

Further, production methods of the compounds having an oxirane ring are not specified. They are synthesized by referring to the following literature: Yuki Gosei (Organic Synthesis) II of Zikken Kagaku Koza (Lecture on Experimental Chemistry) 20, 4th Edition, Pages 213-, 1992, published by Maruzen Co. ltd.; The Chemistry of Heterocyclic Compounds—Small Ring Heterocycles, Part 3, Oxiranes, edited by Alfred Hasfner, published by John & Wiley and Sons, An Interscience Publication, New York, 1985; Yoshimura, Setsuchaku (Adhesion), Vol. 29, No. 12, Page 32, 1985, Vol. 30, No. 5, Page 42, 1986, and Vol. 30, No. 7, Page 42, 1986; JP-A No. 11-100378; and Japanese Patent Publication Nos. 2906245 and 2926262.

Compounds having oxetane rings will now be described.

It is possible to use any of the compounds having oxetane rings known in the art, as disclosed in JP-A Nos. 2001-220526 and 2001-310937. Further, from the viewpoint of an increase in film hardness after curing and of adhesivity to a recording medium, it is preferable to combine a monofunctional oxetane compound having an oxetane ring and a multifunctional oxetane compound having at least two oxetane rings. However, the employment of an oxetane compound having at least five oxetane rings makes it difficult to treat the ink composition due to its high viscosity, and also causes insufficient adhesivity of a cured compound due to the composition's high glass transition temperature. According to the present invention, the oxetane compounds having 1-4 oxetane rings may be used preferably.

(Photo Acid Generating Agents)

Photo acid generating agents according to the present invention are used as a photopolymerization initiator, which enables curing of cationically photopolymerizable compounds via exposure to actinic radiation.

Compounds, for example, used in chemically sensitized photoresists, or in cationic photopolymerization may be applicable as the photo acid generating agent (refer to pages 187-192 of Imaging Yo Yuki Zairyo (Organic Materials Used for Imaging), edited by Yuki Electronics Zairyo Kenkyukai, published by Bunshin Shuppan (1993). Preferred examples according to the present invention will now be listed.

Firstly listed may be examples which include $B(C_6F_5)_4^-$, $PF_6^-$, $AsF_6^-$, $SbF_6^-$, and $CF_3SO_3^-$ salts of aromatic onium compounds such as diazonium, ammonium, iodonium, sulfonium, and phosphonium.

Specific examples of the applicable onium compounds will now be listed.

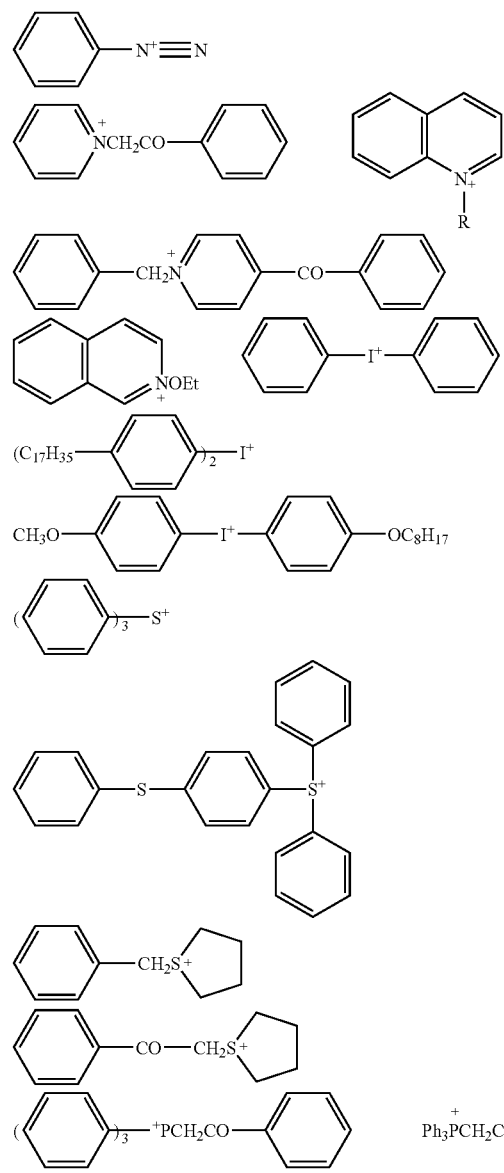

Secondly, sulfone compounds capable of generating sulfonic acid may be applicable. Specific examples will now be listed.

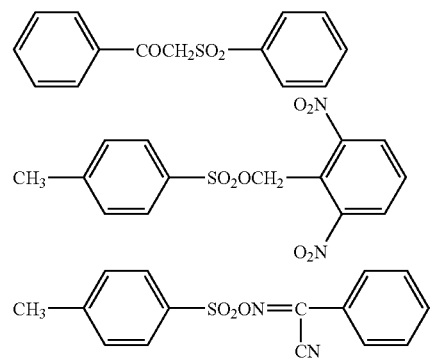

-continued

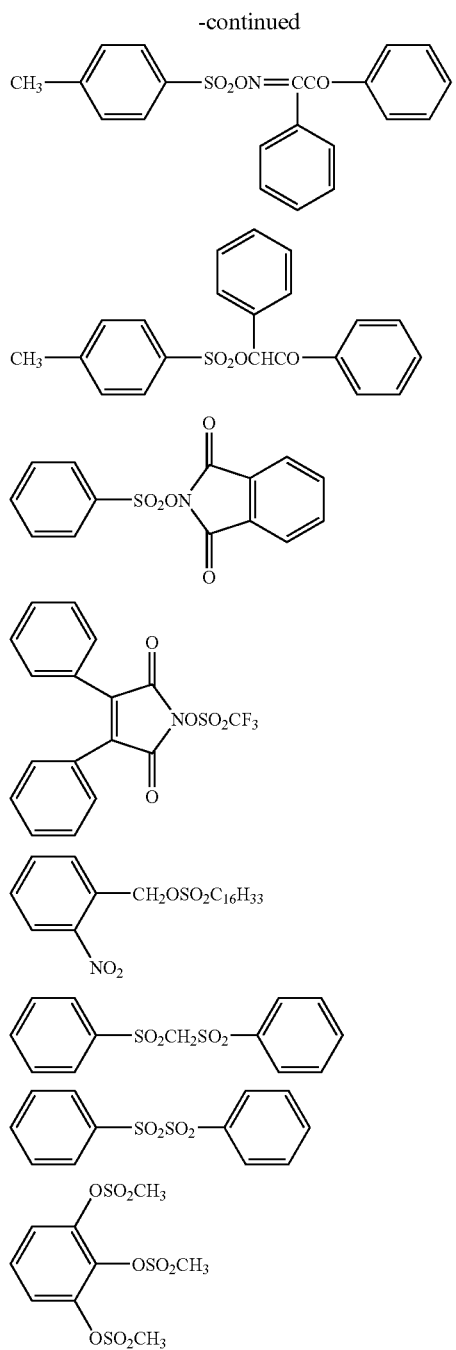

Thirdly, halogen compounds, which photolytically generate hydrogen halides, may be applicable, of which specific examples will now be listed.

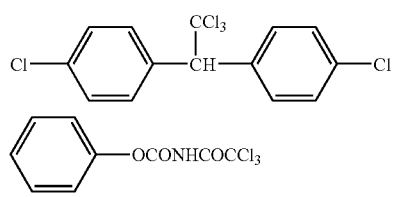

-continued

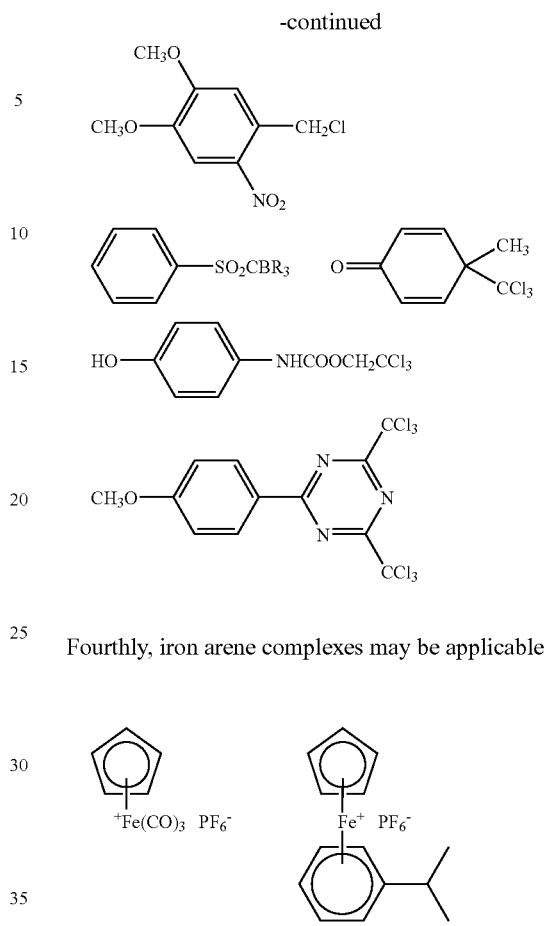

Fourthly, iron arene complexes may be applicable.

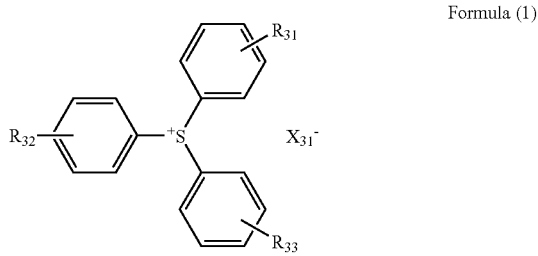

Further, preferred examples used as an ink composition according to the present invention include sulfonium compounds represented by following Formulas (1)-(4), which generate no benzene via exposure to actinic radiation. The sulfonium compounds having a substituent in a benzene ring, joining an $S^+$, satisfy the above conditions.

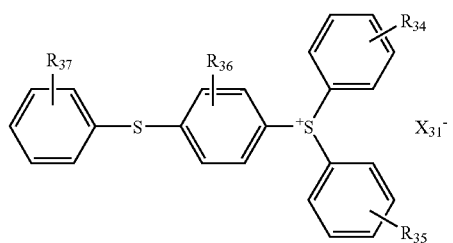

Formula (1)

Formula (2)

-continued

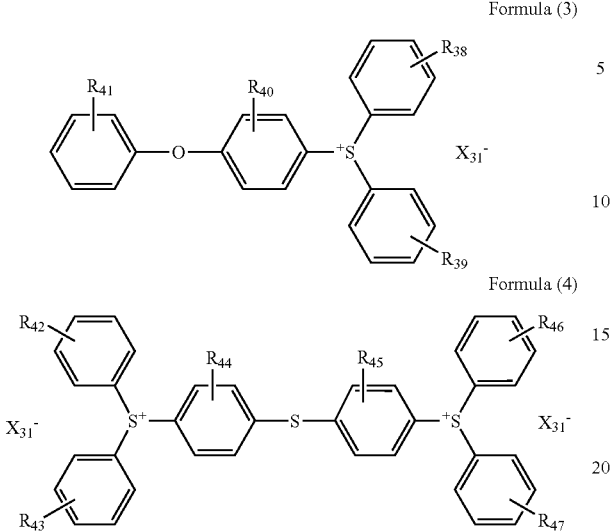

Formula (3)

Formula (4)

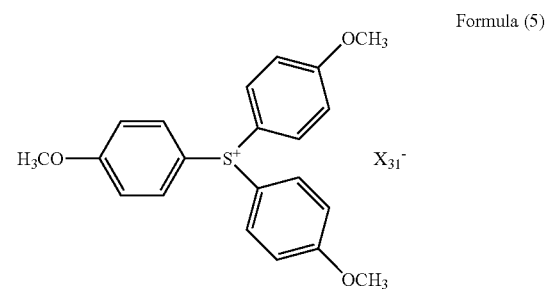

Formula (5)

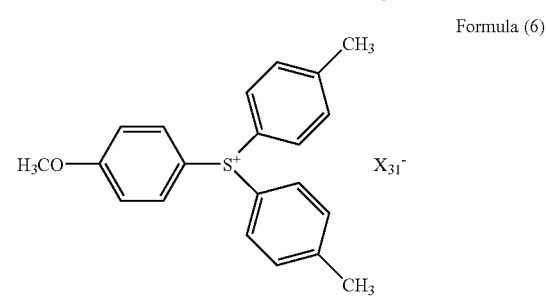

Formula (6)

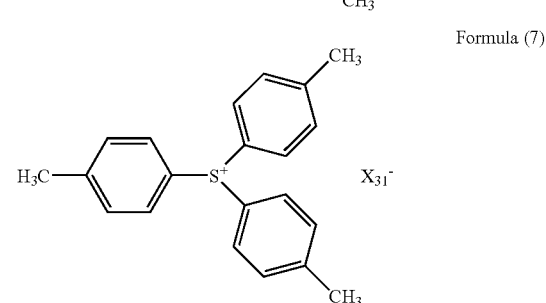

Formula (7)

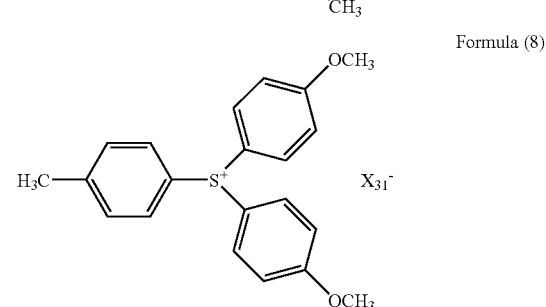

Formula (8)

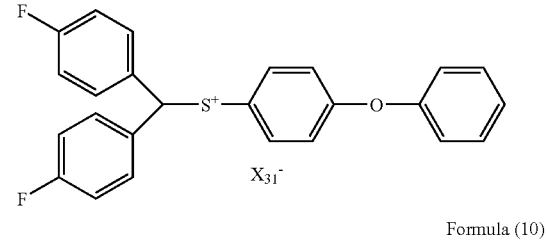

Formula (9)

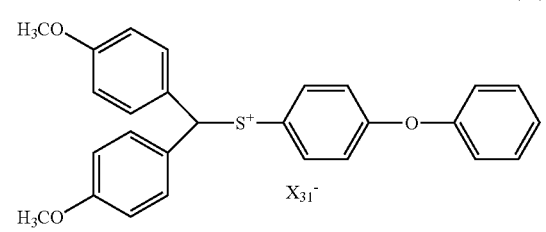

Formula (10)

In above Formulas (1)-(4), $R_{31}$-$R_{47}$ each represent a hydrogen atom, or a substituent. $R_{31}$-$R_{33}$, $R_{34}$-$R_{37}$, $R_{38}$-$R_{41}$, and $R_{42}$-$R_{47}$ each do not represent a hydrogen atom simultaneously.

Preferred examples of the substituent represented by $R_{31}$-$R_{47}$ include an alkyl group (for example, a methyl group, an ethyl group, a propyl group, an isopropyl group, a butyl group, an isobutyl group, a t-butyl group, a pentyl group, and a hexyl group), an alkoxy group (for example, a methoxy group, an ethoxy group, a propoxy group, a butoxy group, a hexyloxy group, a decyloxy group, and a dodecyloxy group), a carbonyl group (for example, an acetoxy group, a propionyloxy group, a decylcarbonyloxy group, a dodecycarbonyloxy group, a methoxycarbonyl group, an ethoxycarbonyl group, and a benzoyloxy group), a phenylthio group, a halogen atom (for example, a fluorine atom, a chlorine atom, a bromine atom, and an iodine atom), a cyano group, a nitro group, and a hydroxyl group.

$X_{31}$ represents a non-nucleophilic anion residue. Examples of $X_{31}$ include a halogen atom (for example, a fluorine atom, a chlorine atom, a bromine atom, and an iodine atom), $B(C_6F_5)_4$, $R_{18}COO$, $R_{19}SO_3$, $SbF_6$, $AsF_6$, $PF_6$, and $BF_4$. However, $R_{18}$ and $R_{19}$ each represent an alkyl group, or a phenyl group which may be substituted with an alkyl group (for example, a methyl group, an ethyl group, a propyl group, and a butyl group), a halogen atom (for example, a fluorine atom, a chlorine atom, a bromine atom, and an iodine atom), a nitro group, a cyano group, and an alkoxy group (for example, a methoxy group, and an ethoxy group). Of these non-nucleophilic anion residues, $B(C_6F_5)_4$ and $PF_6$ are preferable from the viewpoint of safety.

The above compounds are readily synthesized by methods known in the art in the same manner as for photo acid generating agents described in Bulletin of The Chemical Society of Japan, Vol. 71, No. 11, 1998, and Imaging Yo Yuki Zairyo (Organic Materials Used for Imaging), edited by Yuki Electronics Zairyo Kenkyukai, published by Bunshin Shuppan (1993).

In the present invention, it is specifically preferable that the sulfonium salts represented by above Formulas (1)-(4) be at least one kind of sulfonium salts selected from following Formulas (5)-(13). $X_{31}$ represents the non-nucleophilic anion residue as described above.

-continued

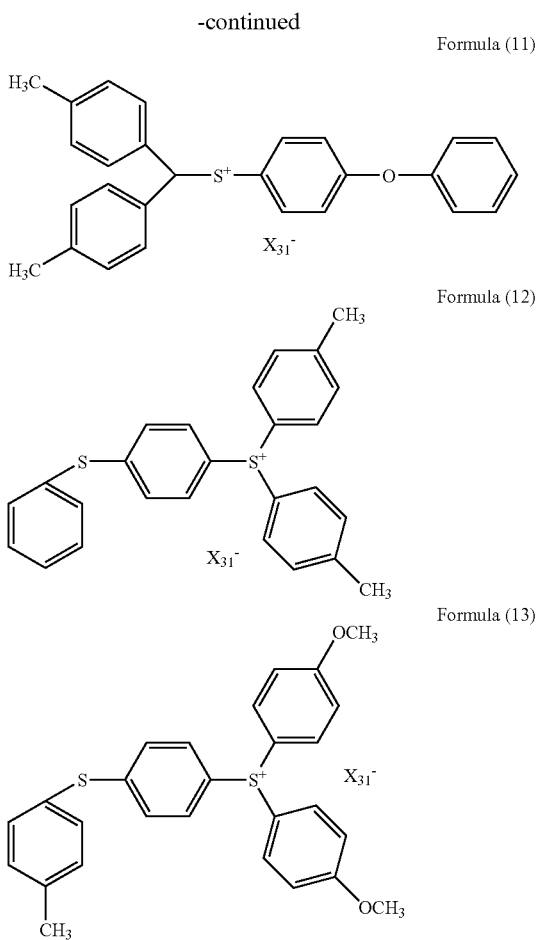

Formula (11)

Formula (12)

Formula (13)

In the present invention, metal complex pigments, especially the metal complex pigments of azo compounds, exhibit markedly preferable dispersibility when dispersed in cationically polymerizable compounds having an oxetane or oxirane ring, via the addition of polymer dispersing agents having a basic functional group at an amine value of 5-40 mg KOH/g. The reason for that is not clearly understood, but it is assumed that the metal complexes of azo compounds have an acidic polar group, while polymers have a basic functional group in the cationically polymerizable monomers, whereby when dispersed in the cationically polymerizable monomers, dispersion stability of the pigments is maintained via adsorption force due to mutual acid-base interaction between the polar groups of the pigments and the dispersing agents.

It is assumed that since the polymer dispersing agents in the embodiments of the present invention incorporate the basic functional group at an amine value of 5-40 mg KOH/g, strong adsorption between the polar group of pigments and the functional group of dispersing agents results, whereby excellent storage stability is realized in the resulting ink. Further, excellent curability is realized after discharge of the ink. The reason for this is assumed to be as follows. When the amine value is less than 5, adsorption between the pigments and the dispersing agents is insufficient to result in an increase in particle diameter and viscosity due to coagulation of pigment particles during aging after the dispersion, while when the amine value exceeds 40, during curing reaction after discharge of the ink, the polar group of the dispersing agents traps photolytically generated acids to decrease the curing rate.

Further, to improve storage stability, it is possible to incorporate any appropriate basic compounds known in the art, into the actinic radiation curable ink-jet ink of the present invention. Representative examples include basic alkaline metal compounds, basic alkaline earth metal compounds, and basic organic compounds, such as amines. Of these, in view of compatibility with photopolymerizable monomers, preferred are amines which include, for example, octylamine, naphthylamine, xylenediamine, dibenzylamine, diphenylamine, dibutylamine, dioctylamine, dimethylaniline, quinuclidine, tributylamine, trioctylamine, tetramethylethylenediamine, tetramethyl-1,6-hexamethylenediamine, hexamethylenetetramine, and triethanolamine.

Basic alkaline metal compounds include hydroxides of alkaline metals (such as lithium hydroxide, sodium hydroxide, or potassium hydroxide), carbonates of alkaline metals (such as lithium carbonate, sodium carbonate, or potassium carbonate), alcolates of alkaline metals (such as sodium methoxide, sodium ethoxide, potassium methoxide, or potassium ethoxide).

Basic alkaline earth metal compounds include hydroxides of alkaline earth metals (such as magnesium hydroxide or calcium hydroxide), carbonates of alkaline metals (such as magnesium carbonate or calcium carbonate), and alcolates of alkaline metals (such as magnesium methoxide). Basic organic compounds include amines as well as nitrogen containing heterocyclic ring compounds such as quinoline and quinolizine.

The concentration of basic compounds, when they are incorporated, is preferably in the range of 10-1,000 ppm by weight with respect to the total photopolymerizable monomers, but is more preferably in the range of 20-500 ppm by weight. The basic compounds may be employed individually or in combinations of a plurality of them.

Further, in order to retard curing in the state of ink in the ink tank, piping, and heads, water may be incorporated. The added amount of water is preferably 1-8% by weight with respect to the entire composition.

Still further, it is possible to prepare a radical-cationic hybrid type curable ink via combination of radically polymerizable monomers with initiators.

In the ink of the present invention, in order to realize stable ejection from the ink head and desired curability irrespective of curing ambience (temperature and humidity), its viscosity is preferably 7-50 mPa·s at 25° C.

Further, the average diameter of pigment particles composed of metal complex pigments according to the present invention is preferably 50-200 nm, but is more preferably 80-170 nm.

The ink composed according to the present invention exhibits excellent storage stability in such a manner that the average particle diameter results in no change after one week storage at 60° C.

Further, when the ink of the present invention was continuously discharged from an ink-jet discharge head, astoundingly, excellent ejection capability (continuous discharge capability) was realized. The reason for this is assumed to be as follows. Since dispersing agents are not released due to strong adsorption via polar group interaction of pigments and dispersing agents, no dispersing agents are adhered to the wall surface of the discharge nozzles, whereby ejection capability (continuous discharge capability) from the nozzles is improved.

Further, ink was prepared and subsequently, was discharged onto a transparent plastic substrate to form a solid image, whereby it was possible to prepare uniform images which resulted in high density and uniform glossiness without formation of wrinkling. The reason for this is assumed to be that alicyclic epoxy compounds having the novel structure described in claims 2-7 are employed instead of conventional alicyclic epoxy compounds. Further, it is assumed that even when applied to the use for outdoor advertisements, it is unnecessary to increase the adhered amount of ink and the pigment concentration in the ink to enhance chroma, whereby ejection stability is enhanced and images of high density, uniform glossiness and excellent color reproduction are produced.

Recording media usable in the present invention, other than common non-coated paper and coated paper, include various non-absorptive plastics and films thereof employed for so-called soft-packaging. Examples of various plastic films include PET film, OPS film, OPP film, ONy film, PVC film, PE film, and TAC film. Other usable plastics include polycarbonate, acrylic resins, ABS, polyacetal, PVA, and rubber. Further, metals and glass are applicable.

The surface energy of these various types of plastic films differs significantly. Consequently, problems have resulted in which the ink dot diameter varies after deposition, depending on the recording media. However, based on the embodiments of the present invention, it is possible to form excellent highly detailed images on recording media exhibiting the wide range of surface energy of 35-60 mN/m, such as OPP film and OPS film exhibiting relatively low surface energy, and PET film which exhibits a relatively high surface energy.

In the present invention, in view of recording medium cost such as packaging expense and production cost, production efficiency of prints, and capability corresponding to various print sizes, it is more advantageous to employ long-length (web) recording media.

It is possible to employ the ink-jet ink of the present invention in the form of a set together with inks incorporating different multi-colored pigments. It is preferable that the above inks are employed in the form of a set of a plurality of inks such as an ink-jet ink set composed of at least a yellow ink-jet ink, a magenta ink-jet ink, and a black ink-jet ink, which is commonly employed to prepare so-called color ink-jet prints.

Further, to form photographic images employing ink-jet printing, so-called dark and light inks, in which the ratio of colorants varies, may be prepared and employed. In terms of color reproduction, if desired, it is preferable to employ special colored inks such as red, green, blue, or white ink.

The image forming method of the present invention will now be described.

The image forming method of the present invention is one in which the above inks are discharged onto recording media via an ink-jet recording system to form images, and the ink is cured via exposure to actinic radiation such as ultraviolet radiation.

(Ink Layer Thickness after Deposition of Ink Proplets)

In the present invention, it is preferable that the total ink layer thickness after deposition of ink droplets on a recording medium and curing via exposure to actinic radiation is preferably 2-25 μm. In the actinic radiation curable ink-jet recording in the screen printing field, at present, the total ink layer thickness exceeds 25 μm. In the soft-package printing field, in which thin plastic materials are frequently employed as recording media, in addition of the above problems such as curling and wrinkling of the recording media, problems occur in which stiffness and feel of quality of the total printed matter vary. Consequently, ink discharge which results in an excessively thick layer is not preferred.

"Total ink layer thickness", as described herein, refers to the maximum value of the ink layer thickness of the image recorded on the recording media. The above total ink layer thickness is as defined for cases in which recording is conducted via a single color ink-jet recording system, as well as 2-color superimposition (secondary color), 3-color superimposition, and 4-color superimposition (white ink base).

(Ink Discharge Conditions)

To ensure discharge stability, preferred discharge conditions are that the recording head and the ink are heated at 35-100° C. The actinic radiation curable ink results in a wide variation of viscosity depending on the change of temperature. Viscosity variation significantly affects the size of ink droplets and the rate of droplet ejection, resulting in degradation of image quality. Accordingly, it is necessary to raise ink temperature and maintain the resulting viscosity at a constant value. The ink temperature is controlled commonly within specified temperature ±5° C., preferably within specified temperature ±2° C., but still more preferably ±1° C.

Further, in the present invention, the droplet volume discharged from each nozzle is preferably 2-20 pl. In order to form highly detailed images, heretofore, the droplet volume has been required to be in the above range. However, when the above droplet volume is discharged, the above discharge stability is particularly demanded. According the present invention, even though discharge of tiny droplets at a volume of 2-20 pl is conducted, discharge stability is enhanced, and enables stable formation of highly detailed images.

(Radiation Exposure Conditions after Deposition of Ink)

In the image forming method of the present invention, actinic radiation exposure conditions are as follows. Actinic radiation is exposed preferably 0.001-1 second after deposition of ink, but is exposed more preferably 0.001-0.5 second. In order to form highly detailed images, it is particularly critical that exposure timing is as soon as possible.

The basic method of actinic radiation exposure methods is disclosed in JP-A No. 60-132767. Based on that, radiation sources are arranged on both sides of the head unit, and the head and the radiation source are scanned via a shuttle system. Exposure is conducted within a specified period after deposition of the ink. Further, curing is completed via another stationary radiation source. U.S. Pat. No. 145,979 discloses, as an exposure method, one which employs optical fibers and another in which UV radiation is exposed to a recording section via hitting collimated radiation onto a mirror surface provided on the side of the unit. In the image forming method of the present invention, either of these exposure methods may be employed.

Further, the following method is one of the preferred embodiments. Radiation exposure is divided into two stages. Initially, actinic radiation is exposed within 0.001-2 seconds after deposition of ink, and after complete printing, actinic radiation is further exposed. By dividing actinic radiation exposure into two stages, it is possible to retard contraction of recording media, which occurs during ink curing.

Heretofore, it has been common that a high illuminance radiation source, which consumes total power of at least 1 kW-hour, is employed to retard dot spreading and bleeding after deposition of ink. However, when such a radiation source is employed, particularly in shrink-label printing, the contraction of recording media is excessive, whereby it has been impossible to employ the above radiation source.

In the present invention, it is preferable to employ actinic radiation of a maximum illuminance in the wavelength region of 254 nm. Even though the radiation source which consumes the total power of at least 1 kW·hour, it is possible to form highly detailed images, and still to control the contraction of recording media within a practically acceptable level.

In the present invention, it is further preferable that the total power consumption of the radiation source, which emits actinic radiation, is less than 1 kW·hour. Examples of radiation sources, which consume power less than 1 kW·hour, include fluorescent lamps, cold-cathode tubes, hot-cathode tubes, and LEDs; however, the present invention is not limited thereto.

The recording apparatus of the present invention will now be described while referring to appropriate drawings. The recording apparatus in the drawings is one embodiment of the present invention, and the recording apparatus of the present invention is not limited only to those in the drawings.

FIG. 1 is a front view showing the structure of the main section of the recording apparatus of the present invention. Recording apparatus 1 is structured by being provided with head carriage 2, recording head 3, exposure means 4, and platen section 5. In this recording apparatus 1, platen section 5 is arranged under recording medium P. Platen section 5 functions to absorb UV radiation and absorbs any UV radiation which has passed through recording medium P. As a result, it is possible to very stably reproduce highly detailed images.

Recording medium P is guided by guide member 6 and is conveyed from the front to the rear in FIG. 1 via the operation of a conveying means (not shown). A head scanning means (also not shown) allows head carriages 2 to reciprocate in direction Y in FIG. 1, whereby scanning of recording head 3, integrated to carriage 2, is conducted.

Head carriage 2 is arranged above recording medium P, and a plurality of recording heads 3, described below, corresponding to the number of colors employed for image printing on recording medium P is housed while the discharge orifice is arranged on the lower side. Head carriage 2 is arranged for recording apparatus 1 main body to enable reciprocation in direction Y of FIG. 1, and via drive of the head scanning means, reciprocation in direction Y of FIG. 1 is conducted.

FIG. 1 is drawn so that head carriage 2 houses recording head 3. In practice, the number of colors of recording head 3 housed in head carriage 2 is appropriately determined.

Recording head 3 discharges an actinic radiation curable ink (for example, a UV curable ink) supplied by an ink supplying means (not shown) onto recording medium P via action of a plurality of discharge means (not shown) provided within the interior. The UV ink discharged from recording head 3 is composed of colorants, polymerizable monomers and initiators, and exhibits a property such that when exposed to UV radiation, the initiators function as a catalyst, so that curing results via crosslinking and polymerization reaction of the monomers.

Recording head 3 moves from one end of recording medium P to the other end in direction Y in FIG. 1, while driven by a scanning means. During scanning performed by the above movement, the UV ink is discharged onto specified areas (being the applicable deposition area) on recording medium P in the form of ink droplets, and the ink droplets are deposited onto the above applicable deposition area.

The above scanning is appropriately repeated several times and the UV ink is discharged onto the applicable deposition area. Thereafter, recording medium P is appropriately moved from the front to the rear in FIG. 1 via the conveying means. While repeating scanning employing the scanning means, the UV ink is discharged onto the next applicable deposition area adjacent to the area on the rearward direction in FIG. 1.

The above operation is repeated, and by discharging the UV ink from recording head 3 under synchronization with the head scanning means and the conveying means, an image composed of an arrangement of UV ink droplets is formed on recording medium P.

Exposure means 4 is composed of ultraviolet lamps, which emit ultraviolet radiation of the specified wavelength at stable exposure energy, and filters which transmit ultraviolet radiation of the specified wavelength. Usable ultraviolet lamps include mercury lamps, metal halide lamps, excimer lasers, ultraviolet lasers, cold-cathode tubes, hot-cathode tubes, blacklights, and LEDs (light emitting diodes). Of these, preferred are band shaped metal halide lamps, cold-cathode tubes, or blacklights. Particularly preferred are low pressure mercury lamps which emit ultraviolet radiation of 254 nm wavelength, cold-cathode tubes, hot-cathode tubes, and sterilization lamps, due to realization of efficient control of the dot diameter. It is possible to prepare exposure means 4 to cure UV ink at low cost by employing the blacklight as a radiation source of exposure means 4.

Exposure means 4 is nearly similar in size to the maximum capable of being set by recording apparatus (being an ink-jet printer) or to be larger than the applicable deposition area of the applicable deposition area onto which the UV ink is discharged via one scanning of recording head 3 driven by the scanning means.

Exposure means 4 is fixed on both sides of head carriage 2 to be nearly parallel to recording medium P.

As noted above, illuminance at the discharge section is regulated by, first of all, shielding entire head 3 from light. Further, it is effective that distance h1 between exposure means 4 and recording medium P is set to be less than distance h2 between ink discharge section 31 of recording head 3, and recording medium P (namely, h1>h2), while distance d between recording head 3 and exposure means 4 is more. Still further, it is more preferable that bellow structure 7 is arranged between recording head 3 and exposure means 4.

It is possible to appropriately change the wavelength of ultraviolet radiation emitted from exposure means 4 by replacing ultraviolet radiation lamps or filters provided with exposure means 4.

The ink of the present invention exhibits excellent discharge stability and works particularly well during formation of images employing line head type recording apparatuses.

Figure 2:
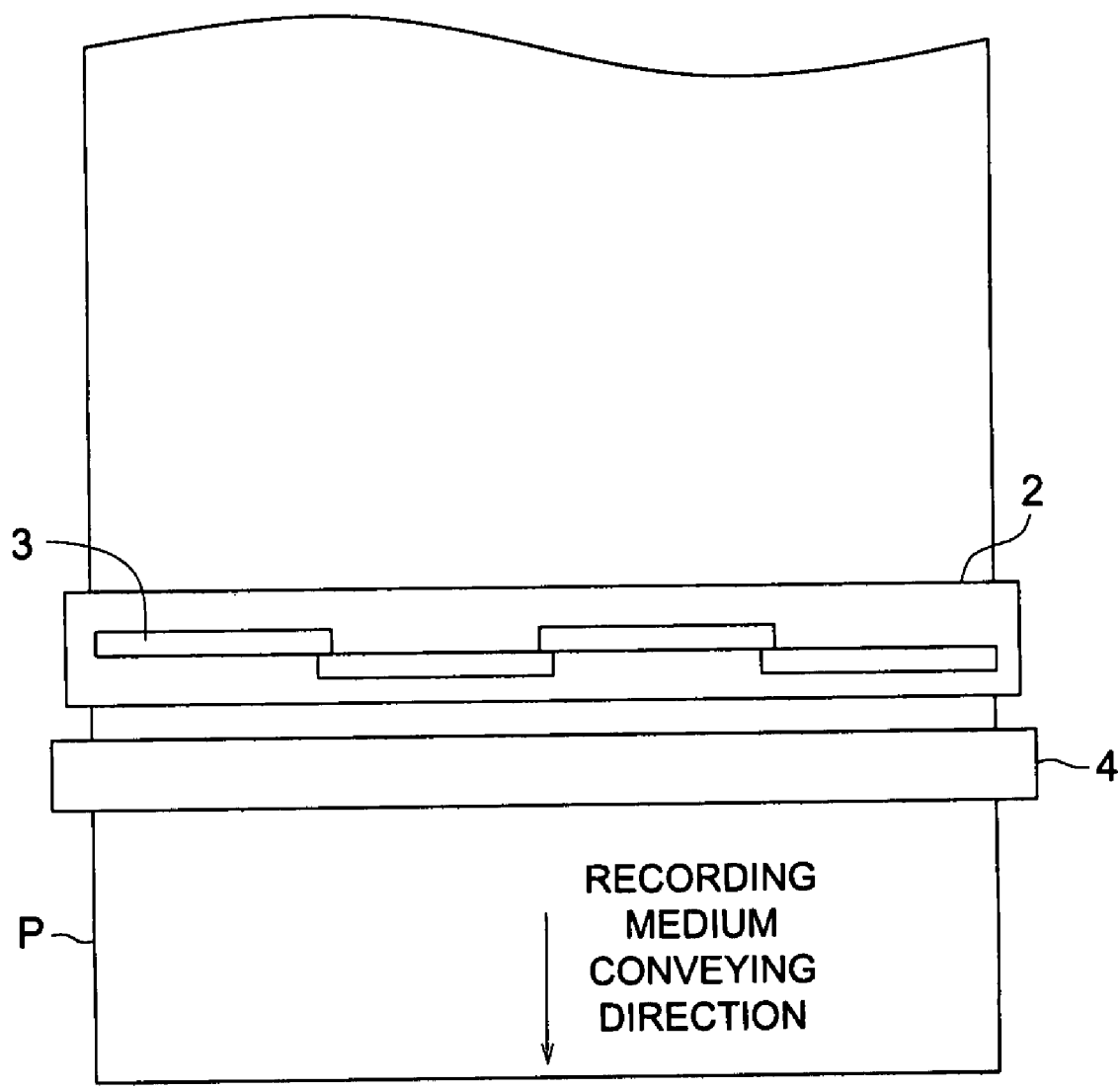
FIG. 2 is a top view showing another example of the structure of the main section of the ink-jet recording apparatus employed in the image forming method of the present invention.

FIG. 2 is a top view showing another example of the structure of the main section of an ink-jet recording apparatus.

The ink-jet recording apparatus shown in FIG. 2 is called a line head system, and a plurality of ink-jet recording heads 3 of each color is mounted on head carriage 2 to cover the entire width of recording medium P.

On the other hand, on the downstream side of head carriage 2, exposure means 4 is arranged to cover the entire area for ink printing so that the entire width of recording medium P is similarly covered. Employed as ultraviolet lamps employed in exposure means 4 may be any of those which are similar to those shown in FIG. 1.

In the above line head system, head carriage 2 and exposure means 4 are stationary and only recording medium P is conveyed, followed by ink ejection and curing to result in image formation.

EXAMPLES

The present invention will now be described with reference to specific examples; however the present invention is not limited thereto.

"Parts" represent parts by weight unless otherwise specified.

Acid value and amine value of dispersing agents were each determined as follows.

(Determination of Amine Value of Dispersing Agent)

A dispersing agent was dissolved in methyl isobutyl ketone, and the resulting solution was subjected to potentiometric titration employing a 0.01 N/L perchloric acid methyl isobutyl ketone solution. The determined value was converted in terms of mg KOH/g and the resulting value was designated as the amine value. The above measurement via potentiometric titration was carried out employing automatic titrator COM-1500, produced by Hiranuma Sangyo Co., Ltd.

(Determination of Acid Value of Dispersing Agent)

A dispersing agent was dissolved in methyl isobutyl ketone, and the resulting solution was subjected to potentiometric titration employing a 0.01 N/L potassium methoxide-methyl isobutyl ketone/methanol (4:1) solution. The determined value was converted in terms of mg KOH/g and the resulting value was designated as the acid value. The above measurement via potentiometric titration was carried out employing automatic titrator COM-1500, produced by Hiranuma Sangyo Co., Ltd.

(Preparation of Dispersion D-1)

The following compounds were placed in a stainless steel beaker and dissolution was carried out over one hour while stirred and heated on a hot plate at 60° C. PB822 (the dispersing agent produced by

| | |
|---|---|
| Ajinomoto-Fine-Techno Co.)(at an acid value of 19 mg KOH/g and an amine value of 16 mg KOH/g) | 7.5 parts |
| OXT 221 (the oxetane compound produced by TOAGOSEI Co., Inc.) | 77.5 parts |

Subsequently, after allowing the above solution to cool to room temperature, the following pigment was added and the resulting mixture was sealed in a polypropylene vessel together with 100 g of 0.5 mm diameter zirconia beads, followed by dispersion over 6 hours employing a paint shaker. The zirconia beads were then removed, whereby Dispersion D-1 was prepared.

| | |
|---|---|
| C.I. Pigment Yellow 150 (metal complex pigment) | 15 parts |

(Preparation of Dispersion D-2)

Another dispersion treatment was carried out in the same manner as in the preparation of Dispersion D-1, except that OXT221 (the oxetane compound, produced by TOAGOSEI Co., Ltd.) was replaced with OXT212 (an oxetane compound produced by TOAGOSEI Co., Ltd.). The resulting dispersion was designated as Dispersion D-2.

(Preparation of Dispersion D-3)

The following compounds were placed in a stainless steel beaker and dissolution was carried out over one hour while stirred and heated on a hot plate at 50° C.

| | |
|---|---|
| ED-251 (a dispersing agent, produced by Kusumoto Chemicals Ltd.)(at an acid value of 14 mg KOH/g and an amine value of 20 mg KOH/g) | 7.5 parts |
| OXT 221 (an oxetane compound produced by TOAGOSEI Co., Ltd.) | 77.5 parts |

Subsequently, dispersion was carried out in the same manner as in preparation of Dispersion D-1. The resulting dispersion was designated as Dispersion D-3.

(Preparation of Dispersion D-4)

The following compounds were placed in a stainless steel beaker and dissolution was carried out over one hour while stirred and heated on a hot plate at 50° C.

| | |
|---|---|
| SOLSPERSE 32000 (a dispersing agent, produced by Avicia Ltd.)(at an acid value of 25 mg KOH/g and an amine value of 27 mg KOH/g) | 7.5 parts |
| OXT 221 (an oxetane compound produced by TOAGOSEI Co., Ltd.) | 77.5 parts |

Subsequently, dispersion was carried out in the same manner as in preparation of Dispersion D-1. The resulting dispersion was designated as Dispersion D-4.

(Preparation of Dispersion D-5)

The following compounds were placed in a stainless steel beaker and dissolution was carried out over one hour while stirred and heated on a hot plate at 50° C.

| | |
|---|---|
| SOLSPERSE 24000GR (a dispersing agent, produced by Avicia Ltd.)(at an acid value of 35 mg KOH/g and an amine value of 36 mg KOH/g) | 7.5 parts |
| OXT 221 (an oxetane compound produced by TOAGOSEI Co., Ltd.) | 77.5 parts |

Subsequently, dispersion was carried out in the same manner as in preparation of Dispersion D-1. The resulting dispersion was designated as Dispersion D-5.

(Preparation of Dispersion D-6)

Dispersion was carried out in the same manner as in the preparation of Dispersion D-1, except that instead of C.I. Pigment Yellow 150, the following pigment was employed. The resulting dispersion was designated as Dispersion D-6.

| | |
|---|---|
| C.I. Pigment Yellow 153 (being a metal complex pigment) | 15 parts |

(Preparation of Dispersion D-7)

The following compounds were placed in a stainless steel beaker and dissolution was carried out over one hour while stirred and heated on a hot plate at 50° C.

| | |
|---|---|
| SOLSPERSE 26000 (a dispersing agent produced by Avicia Ltd., having an acidic functional group)(at an acid value of 123 mg KOH/g and an amine value of 35 mg KOH/g) | 7.5 parts |
| OXT 221 (an oxetane compound produced by TOAGOSEI Co., Ltd.) | 77.5 parts |

Subsequently, dispersion was carried out in the same manner as in preparation of Dispersion D-1. The resulting dispersion was designated as Dispersion D-7.

(Preparation of Dispersion D-8)

The following compounds were placed in a stainless steel beaker and dissolution was carried out over one hour while stirred and heated on a hot plate at 50° C.

| | |
|---|---|
| PB711 (a dispersing agent produced by Ajinomoto-Fine-Techno Co., Inc.), (at an acid value of - and an amine value of 40 mg KOH/g) (at an effective component of 40%) | 18.8 parts |
| OXT 221 (an oxetane compound produced by TOAGOSEI Co., Ltd.) | 66.2 parts |

Subsequently, dispersion was carried out in the same manner as in preparation of Dispersion D-1. The resulting dispersion was designated as Dispersion D-8.

(Preparation of Dispersion D-9)

The following compounds were placed in a stainless steel beaker and dissolution was carried out over one hour while stirred and heated on a hot plate at 50° C.

| | |
|---|---|
| SOLSPERSE 18000 (a dispersing agent produced by Avicia Ltd.)(at an acid value of 11 mg KOH/g and an amine value of 0 mg KOH/g) | 7.5 parts |
| OXT 221 (an oxetane compound produced by TOAGOSEI Co., Ltd.) | 77.5 parts |

Subsequently, a dispersion treatment was carried out in the same manner as in preparation of Dispersion D-1. The resulting dispersion was designated as Dispersion D-9.

(Preparation of Dispersion D-10)

Dispersion was carried out in the same manner as in the preparation of Dispersion D-1, except that instead of C.I. Pigment Yellow 150, the following pigment was employed. The resulting dispersion was designated as Dispersion D-10.

| | |
|---|---|
| C.I. Pigment Yellow 120 (benzimidazolone based) | 15 parts |

(Preparation of Dispersion D-11)

Dispersion was carried out in the same manner as in the preparation of Dispersion D-1, except that instead of C.I. Pigment Yellow 150, the following pigment was employed. The resulting dispersion was designated as Dispersion D-11.

| | |
|---|---|
| C.I. Pigment Yellow 138 (quinophtharone based) | 15 parts |

Table 1 lists preparation formulae of Dispersions D-1-11, while Table 2 lists acid values and amine values of the polymer dispersing agents employed in the dispersion treatment of each dispersion.

TABLE 1

| | | | | | Polymer Dispersing Agent | | | |
|---|---|---|---|---|---|---|---|---|
| Dispersion No. | Pigment Type | Added Amount of Pigment | Solvent OXT221 | Solvent OXT212 | Dispersing Agent Type | Added Amount of Dispersing Agent | Amine Value of Dispersing Agent | Remarks |
| D-1 | P.Y150 | 15 parts | 77.5 parts | | P.B822 | 7.5 parts | 16 | Inv. |
| D-2 | P.Y150 | 15 parts | | 77.5 parts | P.B822 | 7.5 parts | 16 | Inv. |
| D-3 | P.Y150 | 15 parts | 77.5 parts | | ED251 | 7.5 parts | 20 | Inv. |
| D-4 | P.Y150 | 15 parts | 77.5 parts | | S.32000 | 7.5 parts | 27 | Inv. |
| D-5 | P.Y150 | 15 parts | 77.5 parts | | S.24000GR | 7.5 parts | 36 | Inv. |
| D-6 | P.Y153 | 15 parts | 77.5 parts | | P.B822 | 7.5 parts | 16 | Inv. |
| D-7 | P.Y150 | 15 parts | 77.5 parts | | S.26000 | 7.5 parts | 35 | Comp. |
| D-8 | P.Y150 | 15 parts | 66.2 parts | | P.B.711 | 18.8 parts | 45 | Comp. |
| D-9 | P.Y150 | 15 parts | 77.5 parts | | S.18000 | 7.5 parts | 0 | Comp. |
| D-10 | P.Y120 | 15 parts | 77.5 parts | | P.B822 | 7.5 parts | 16 | Comp. |
| D-11 | P.Y138 | 15 parts | 77.5 parts | | P.B822 | 7.5 parts | 16 | Comp. |

Note)

The effective component of P.B.711 was 40%.

Inv.: Present Invention,

Comp.: Comparative Example

TABLE 2

| Dispersing Agent Type | Functional Group | Amine Value (mg KOH/g) | Acid Value (mg KOH/g) | Remarks |
|---|---|---|---|---|
| P.B.822 | basic | 16 | 19 | AJISPER Series, produced by Ajinomoto-Fine-Techno Co., Inc. |
| P.B.711 | basic | 45 | — | AJISPER Series, produced by Ajinomoto-Fine-Techno Co., Inc. |
| ED251 | basic | 20 | 14 | DISPERON Series, produced by Kusumoto Chemicals, Ltd. |
| S.24000GR | basic | 36 | 35 | OLSPERSE Series, produced by Avicia Ltd. |
| S.32000 | basic | 27 | 25 | OLSPERSE Series, produced by Avicia Ltd. |
| S.26000 | acidic | 35 | 123 | OLSPERSE Series, produced by Avicia Ltd. |
| S.18000 | basic | 0 | 11 | OLSPERSE Series, produced by Avicia Ltd. |

<<Preparation of Ink Composition>>

Based on the ink formulae described in Table 3, each additive was sequentially added to each of the pigment dispersions prepared as above, and the resulting mixture was filtered through a 1.0 μm membrane filter, whereby Inks 1-24 were prepared. The numeric values listed in Table 3 represent percent by weight.

TABLE 3

| | Colorant | | | | Compound Having Oxirane Ring | | | | Surface Active | Polymer Dispersing | | | |
| | Pigment Dispersion | | Oxetane Compound | | 1 | | 2 | | Agent | Agent | | | |
| Ink No. | Number | Added Amount | OXT221 | OXT212 | Type | Added Amount | Type | Added Amount | *1 | F475 | *2 | *3 | Remarks |
|---|---|---|---|---|---|---|---|---|---|---|---|---|---|
| 1 | D-1 | 30.00 | 40.54 | | EPA-7 | 29.00 | | | 0.45 | 0.01 | 16 | 19 | Inv.-1 |
| 2 | D-1 | 30.00 | 42.49 | | EPB-1 | 27.00 | | | 0.50 | 0.01 | 16 | 19 | Inv.-2 |
| 3 | D-1 | 30.00 | 44.49 | | PO | 25.00 | | | 0.50 | 0.01 | 16 | 19 | Inv.-3 |
| 4 | D-1 | 30.00 | | 42.46 | DEP | 27.00 | | | 0.52 | 0.02 | 16 | 19 | Inv.-4 |
| 5 | D-1 | 30.00 | 36.11 | | E-4030 | 33.40 | | | 0.48 | 0.01 | 16 | 19 | Inv.-5 |
| 6 | D-1 | 30.00 | 40.65 | | EPC-1 | 28.90 | | | 0.45 | | 16 | 19 | Inv.-6 |
| 7 | D-2 | 30.00 | 29.05 | 11.00 | EPD-9 | 29.50 | | | 0.44 | 0.01 | 16 | 19 | Inv.-7 |
| 8 | D-2 | 30.00 | 37.98 | | PO | 4.50 | EPC-1 | 27.00 | 0.50 | 0.02 | 16 | 19 | Inv.-8 |
| 9 | D-2 | 30.00 | 38.47 | | EPC-1 | 31.00 | | | 0.52 | 0.01 | 16 | 19 | Inv.-9 |
| 10 | D-2 | 30.00 | | 40.53 | EPB-1 | 29.00 | | | 0.45 | 0.02 | 16 | 19 | Inv.-10 |
| 11 | D-3 | 30.00 | 38.55 | | EPB-7 | 31.00 | | | 0.44 | 0.01 | 20 | 14 | Inv.-11 |
| 12 | D-4 | 30.00 | 40.54 | | EPA-7 | 29.00 | | | 0.45 | 0.01 | 27 | 25 | Inv.-12 |
| 13 | D-5 | 30.00 | 40.54 | | EPA-7 | 29.00 | | | 0.45 | 0.01 | 36 | 35 | Inv.-13 |
| 14 | D-6 | 30.00 | 40.54 | | EPA-7 | 29.00 | | | 0.45 | 0.01 | 16 | 19 | Inv.-14 |
| 15 | D-7 | 30.00 | 41.50 | | EPB-1 | 28.00 | | | 0.48 | 0.02 | 35 | 123 | Comp.-1 |
| 16 | D-7 | 30.00 | 44.48 | | DEP | 25.00 | | | 0.50 | 0.02 | 35 | 123 | Comp.-2 |
| 17 | D-7 | 30.00 | 32.47 | 10.00 | E-4030 | 27.00 | | | 0.51 | 0.02 | 35 | 123 | Comp.-3 |
| 18 | D-7 | 30.00 | 39.54 | | E-4030 | 30.00 | | | 0.45 | 0.01 | 35 | 123 | Comp.-4 |
| 19 | D-8 | 30.00 | 44.65 | | EPB-1 | 25.00 | | | 0.35 | | 45 | — | Comp.-5 |
| 20 | D-8 | 30.00 | 36.49 | | E-4030 | 33.00 | | | 0.50 | 0.01 | 45 | — | Comp.-6 |
| 21 | D-9 | 30.00 | 44.65 | | EPB-1 | 25.00 | | | 0.35 | | 0 | 11 | Comp.-7 |
| 22 | D-9 | 30.00 | 36.49 | | E-4030 | 33.00 | | | 0.50 | 0.01 | 0 | 11 | Comp.-8 |
| 23 | D-10 | 30.00 | 40.54 | | EPA-7 | 29.00 | | | 0.45 | 0.01 | 16 | 19 | Comp.-9 |
| 24 | D-11 | 30.00 | 40.54 | | EPA-7 | 29.00 | | | 0.45 | 0.01 | 16 | 19 | Comp.-10 |

*1: Photopolymerization Initiator SP-152,
*2: Amine Value (mg KOH/g)
*3: Acid Value (mg KOH/g),
Inv.: Present Invention,
Comp.: Comparatives Example Each of the abbreviated additives in Table 3 will now be detailed.

(Oxetane Compounds)

OXT-221: di[1-ethyl(3-oxetanyl)]methyl ether (produced by TOAGOSEI Co., Ltd.)

OXT-212: product of TOAGOSEI Co., Ltd.

(Epoxy Compounds)

PO: α-pinene oxide

DEP: 1,3:8,9 diepoxylimonene

E-4030: SANSOSIZER E-4030 (epoxylated butyl aliphate, produced by New Japan Chemical Co., Ltd.)

(Photo Acid Generating Agent)

SP-152: triphenyl sulfonium salt ("ADEKA OPTOMER SP-152", produced by Asahi Denka K.K.)

(Surface Active Agent)

F-475: MEGAFAX F475 acrylic oligomer having a perfluoroalkyl group (being a product of Dainippon Ink and Chemicals, Inc.)

<<Formation of Ink-Jet Images>>

(Image Forming Method A)

Each of Inks 1-26, prepared as above, was loaded in the ink-jet recording apparatus of the carriage system, structured as shown by FIG. 1, provided with piezo type ink-jet nozzles. Subsequently, each of the images was prepared by continuously printing solid images onto a 120 μm thick, 600 mm wide, and 500 m long polyethylene terephthalate film. The ink feeding system was composed of an ink tank, a feeding pipe, a pre-chamber ink tank immediately prior to the head, piping fitted with filters, and a piezo head. Heating was carried out to 50° C., while insulating from the pre-chamber tank to the head portion. The piezo head was driven to enable discharge of multi-size dots of 2-20 pl to realize a resolution of 720×720 dpi, and each ink was continuously ejected. After ink deposition, curing was instantaneously carried out (within less than 0.5 second after deposition) via lamp units on both sides of the carriage. After recording, the thickness of the total ink layer was determined, resulting in a range of 2.3-13 μm. Term "dpi", as used in the present invention, represents the number of dots per 2.54 cm. Incidentally, each of the ink-jet images was formed at an ambience of 25° C. and 30% relative humidity, based on the above method.

(Image Forming Method B)

Each image was prepared in the same manner as in above Image Forming Method A, except that the ink-jet recording apparatus of the line head recording method, described in FIG. 2, and each of Inks 1-24, prepared as above, was loaded.

Exposures from the exposure sources employed in each of the above image forming methods are as follows.

Exposure source employed in Recording Apparatus A: high pressure mercury lamp VZERO 085 (at a peak wavelength of 254 nm and a maximum illuminance of 400 mW/cm$^2$, produced by INTEGRATED TECHNOLOGY Co.)

Exposure source employed in Recording Apparatus B: low pressure mercury lamp (a customized lamp of Iwasaki Electric Co., Ltd., in which 5 lamps were arranged as a line radiation source at an exposure area of 120 mm (in the longitudinal direction)×620 mm (in the lateral direction), a peak wavelength of 254 nm and a maximum illuminance of 50 mW/cm$^2$).

The represented illuminance of each of the above exposure sources was determined in terms of integrated illuminance at 253 nm, employing NVPF-A1, produced by Iwasaki Electric Co., Ltd.

<<Evaluation of Inks and Formed Images>>

(Evaluation of Storage Stability)

The particle diameter of each of the actinic radiation curable inks, formulated as listed in Table 3, was determined employing a NANO Series particle size distribution meter, produced by Malvern Instruments Ltd. Thereafter, 100 ml of each ink was placed in a sealed sample bottle so that no evaporation occurred, and was allowed to stand in a 60° C. thermostat for one week. Subsequently, the particle diameter of the resulting ink was again determined employing the above meter and a variation ratio of the average particles diameter was obtained. Ink storage stability was evaluated based on the following criteria.

The variation of average particle diameter was defined as follows.

Variation ratio of average particular diameter=(average particle diameter of ink after storage at 60° C. for one week–average particle diameter of the ink)÷(average particle diameter of the ink prior to storage)×100(%)

5: Variation ratio of average particular diameter of ink was less than 5%

4: Variation ratio of average particular diameter of ink was 5—less than 10%

3: Variation ratio of average particular diameter of ink was 10—less than 25%

2: Variation ratio of average particular diameter of ink was 25—less than 50%

1: Variation ratio of average particular diameter of ink was at least 50%

Table 4 shows the results.

(Evaluation of Ejection Capability)

Each of the actinic radiation curable inks listed in Table 3 was continuously discharged employing the above ink-jet recording apparatus (employing a piezo system of 256 nozzles), and ink ejection capability was evaluated based on the following criteria.

5: over one-hour of continuous discharge, normal ejection was noted from all nozzles 4: over one-hour of continuously discharge, abnormal ejection was noted from 1-2 nozzles 3: over one-hour of continuous discharge, abnormal ejection was noted from 3-5 nozzles 2: over-one-hour of continuous discharge, abnormal ejection was noted from 6-10 nozzles 1: over one-hour of continuous discharge, abnormal ejection was noted from at least 11 nozzles (Evaluation of Curability)

With regard to each of the actinic radiation curable inks prepared based on the formulation listed in Table 3, images were formed employing Image Forming Methods A and B. During the above image formation, the surface of each of the images was touched by fingers immediately after exposure to actinic radiation, and curability was evaluated based on the following criteria.

A: the surface of the formed image was hardly tacky and had undergone sufficient curing B: the surface of the formed image was slightly tacky, but had undergone sufficient curing C: the surface of the formed image was tacky and had undergone insufficient curing D: the formed image was not sufficiently cured but flowed (Evaluation of Image Density)

According to Image Forming Method A, a yellow image was formed employing each of the actinic radiation curable inks formulated as described in Table 3, and the resulting density was determined under the following conditions, employing a calorimeter (SPECTROLINE KEY WIZARD, produced by Gretag Macbeth Co.).

Light source: D50, visual field: 2°, visual field density:

ANSI T, white standard: abs, and filter: no-filter

Yellow image density was evaluated based on the following criteria.

A: yellow reflection density was at least 1.1

B: yellow reflection density was 0.9—less than 1.1

C: yellow reflection density was 0.7—less than 0.9

D: yellow reflection density was less than 0.7

(Evaluation of Non-Uniform Glossiness)

According to Image Forming Method A, a yellow image was formed employing each of the actinic radiation curable inks formulated as described in Table 3, and the glossiness of each image was visually evaluated.

A: uniform glossiness was noted from low through high density

B: slight non-uniform glossiness was noted at high density

C: non-uniform glossiness was noted at high density, resulting in problems in practical application (Evaluation of Wrinkling)

By employing the above ink-jet recording apparatus, solid images were formed employing each of the actinic radiation curable inks listed in Table 3 according to Image Forming Methods A and B. Formation of wrinkling was visually observed, and wrinkling was evaluated based on the following criteria.

A: the solid image was uniformly glossy and resulted in no wrinkling

B: slight wrinkling was noted, but was at a commercially viable quality level

C: obvious wrinkling was noted and further, a decrease in glossiness and reflection density was also noted, resulting in quality beyond the commercially viable limit Table 4 shows the above results.

TABLE 4

| | Ink No. | Dispersion | Pigment Concentration (% by weight) | Storage Stability | Ejection Capability | Curability Image Forming Method A | Curability Image Forming Method B | Color Reproduction Image Density (O.D) | *1 | Wrinkling Evaluation Image Forming Method A | Wrinkling Evaluation Image Forming Method B |
|---|---|---|---|---|---|---|---|---|---|---|---|
| **1 | INK-1 | D-1 | 4.5 | 5 | 5 | A | A | A | A | A | A |
| **2 | INK-2 | D-1 | 4.5 | 5 | 5 | A | A | A | A | A | A |
| **3 | INK-3 | D-1 | 4.5 | 5 | 5 | A | A | A | A | A | A |
| **4 | INK-4 | D-1 | 4.5 | 5 | 5 | A | A | A | A | A | A |
| **5 | INK-5 | D-1 | 4.5 | 5 | 5 | A | A | A | A | A | A |
| **6 | INK-6 | D-2 | 4.5 | 5 | 5 | A | A | A | A | A | A |
| **7 | INK-7 | D-2 | 4.5 | 5 | 5 | A | A | A | A | A | A |
| **8 | INK-8 | D-2 | 4.5 | 5 | 5 | A | A | A | A | A | A |
| **9 | INK-9 | D-2 | 4.5 | 5 | 5 | A | A | A | A | A | A |
| **10 | INK-10 | D-2 | 4.5 | 5 | 5 | A | A | A | A | A | A |
| **11 | INK-11 | D-3 | 4.5 | 4 | 4 | A | A | A | A | A | A |
| **12 | INK-12 | D-4 | 4.5 | 4 | 4 | B | B | B | A | A | A |
| **13 | INK-13 | D-5 | 4.5 | 4 | 4 | B | B | B | A | A | A |
| **14 | INK-14 | D-6 | 4.5 | 5 | 4 | A | A | B | A | A | A |
| Comp. 1 | INK-15 | D-7 | 4.5 | 2 | 1 | C | C | C | C | B | B |
| Comp. 2 | INK-16 | D-7 | 4.5 | 2 | 1 | C | C | C | C | B | B |
| Comp. 3 | INK-17 | D-7 | 4.5 | 2 | 1 | C | C | C | C | B | B |
| Comp. 4 | INK-18 | D-7 | 4.5 | 2 | 1 | C | C | C | C | B | B |
| Comp. 5 | INK-19 | D-8 | 4.5 | 3 | 2 | D | D | D | C | C | C |
| Comp. 6 | INK-20 | D-8 | 4.5 | 3 | 2 | D | D | D | C | C | C |
| Comp. 7 | INK-21 | D-9 | 4.5 | 2 | 1 | B | B | C | C | B | B |
| Comp. 8 | INK-22 | D-9 | 4.5 | 2 | 1 | B | B | C | C | B | B |
| Comp. 9 | INK-23 | D-10 | 4.5 | 5 | 5 | B | B | C | B | A | A |
| Comp. 10 | INK-24 | D-11 | 4.5 | 5 | 5 | B | B | C | B | A | A |

*1: Non-Uniform Glossiness,

**Example,

Comp.: Comparative Example

As can clearly be seen from the results of Table 4, actinic radiation curable ink-jet inks, which incorporate metal complex pigments, cationically polymerizable compounds, polymer dispersing agents having a basic functional group at an amine value of 5-40 mg KOH/g, and photo acid generating agents, where the above cationically polymerizable compounds incorporate the compounds having an oxirane ring described in claims 2-7, resulted in no wrinkling and exhibited excellent curability, even when employed in a carriage system or line head system ink-jet recording apparatus, compared to the Comparative Examples.

Further, the inks of the present invention resulted in excellent color reproduction of high image density (O.D. value) and no wrinkling in either above image forming method. Still further, in terms of ejection capability, the inks of the present invention resulted in normal discharge from almost all nozzles, while the inks of Comparative Examples resulted in abnormal discharge. Further, it was noted that compared to Comparative Examples, excellent storage stability was realized with no coagulation of pigments (Comparative Examples 9 and 10 are excluded). Comparative Examples 9 and 10 were cases in which pigments employed in Example 1 were replaced with P. Y120 and P. Y138, and resulted in inferior image density and uniform glossiness, compared to the Examples of the present invention.

The invention claimed is:

1. An actinic radiation curable ink-jet ink comprising:
a metal complex of an azo pigment;
a cationically polymerizable compound;
a polymer dispersing agent having a basic functional group exhibiting an amine value of 5-40 mg KOH/g; and
a photo acid generating agent, wherein the metal complex of the azo pigment is at least one of C.I. Pigment Yellow 150 and C.I. Pigment Yellow 153; and the cationically polymerizable compound comprises an oxirane ring.

2. The actinic radiation curable ink-jet ink of claim 1, wherein the cationically polymerizable compound comprising an oxirane ring is represented by Formula (1):

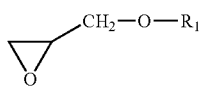

Formula (1)

wherein $R_1$ represents an unsubstituted or substituted alkyl group having 1-10 carbon atoms; an unsubstituted or substituted aromatic group; or an acyl group.

3. The actinic radiation curable ink-jet ink of claim 1, wherein the cationically polymerizable compound comprising an oxirane ring is represented by Formula (2):

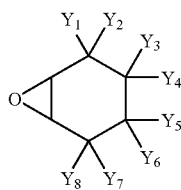

Formula (2)

wherein $Y_1$-$Y_8$ each independently represent a hydrogen atom, an unsubstituted or substituted alkyl, carbonyl, alkoxy, or cycloalkoxy group, provided that $Y_1$ and $Y_8$ may be jointed to form a methylene bond or an ether bond.

4. The actinic radiation curable ink-jet ink of claim 1, wherein the cationically polymerizable compound comprising an oxirane ring is α-pinene oxide.

5. The actinic radiation curable ink-jet ink of claim 1, wherein the cationically polymerizable compound comprising an oxirane ring is 1,2:8,9-diepoxylimonene.

6. The actinic radiation curable ink-jet ink of claim 1, wherein the cationically polymerizable compound comprising an oxirane ring is an epoxidized vegetable oil having an unsaturated bond.

7. The actinic radiation curable ink-jet ink of claim 1, wherein the cationically polymerizable compound comprising an oxirane ring is represented by Formula (A):

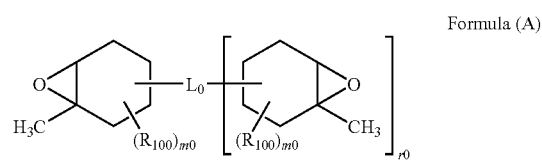

Formula (A)

wherein $R_{100}$ represents a substituent, m0 represents an integer of 0-2, r0 represents an integer of 1-3, and $L_0$ represents a single bond or a (r0+1) valent bonding group having 1-15 carbon atoms, which may incorporate an oxygen atom or a sulfur atom in a backbone of the bonding group.

8. The actinic radiation curable ink-jet ink of claim 1, further comprising a second cationically polymerizable compound which comprises an oxetane ring.

9. The actinic radiation curable ink-jet ink of claim 1, wherein the metal complex pigment has an average particle diameter of 50-200 nm.

10. The actinic radiation curable ink-jet ink of claim 1, wherein the actinic radiation curable ink-jet ink has a viscosity 7-50 mPa·s measured at 25° C.

11. A method of forming an image comprising the steps of:
ejecting droplets of the actinic radiation curable ink-jet ink of claim 1 on a recording medium from nozzles of an ink-jet recording head; and
irradiating the ejected droplets of the ink on the recording medium with actinic rays to cure the ink.

12. A method of forming an image comprising the steps of:
ejecting droplets of the actinic radiation curable ink-jet ink of claim 1 on a recording medium from nozzles of an ink-jet recording head; and
irradiating the ejected droplets of the ink on the recording medium with actinic rays during the time between 0.001 and 1 second after the droplets of the ink are deposited on the recording medium.

13. A method of forming an image comprising the steps of:
ejecting droplets of the actinic radiation curable ink-jet ink of claim 1 on a recording medium from nozzles of an ink-jet recording head; and
irradiating the ejected droplets of the ink on the recording medium with actinic rays to cure the ink, wherein, the cured ink has a total thickness of 2-25 μm.

14. A method of forming an image comprising the steps of:
ejecting droplets of the actinic radiation curable ink-jet ink of claim 1 on a recording medium from nozzles of an ink-jet recording head; and
irradiating the ejected droplets of the ink on the recording medium with actinic rays to cure the ink, wherein each of the droplets of the ink from the nozzles of the ink-jet recording head has a volume is 2-20 pl.

15. A method of forming an image comprising the steps of:
ejecting droplets of the actinic radiation curable ink-jet ink of claim 11 on a recording medium from nozzles of an ink-jet recording head; and
irradiating the ejected droplets of the ink on the recording medium with actinic rays to cure the ink, wherein the ink-jet recording head is a line-head.

16. The actinic radiation curable ink-jet of claim 1, wherein the polymer dispersing agent having the basic functional group exhibits the amine value of 5 to 19 mg KOH/g.

* * * * *